US012668058B2

(12) United States Patent
Nishikawa

(10) Patent No.: US 12,668,058 B2
(45) Date of Patent: Jun. 30, 2026

(54) JETTING HEAD CONTROL DEVICE, JETTING HEAD CONTROL METHOD, PROGRAM, AND LIQUID JET SYSTEM

(71) Applicant: FUJIFILM Corporation, Tokyo (JP)

(72) Inventor: Baku Nishikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 147 days.

(21) Appl. No.: 18/890,767

(22) Filed: Sep. 20, 2024

(65) Prior Publication Data

US 2025/0010609 A1 Jan. 9, 2025

Related U.S. Application Data

(63) Continuation of application No. PCT/JP2023/009553, filed on Mar. 13, 2023.

(30) Foreign Application Priority Data

Mar. 24, 2022 (JP) ................................ 2022-049140

(51) Int. Cl.
*B41J 2/045* (2006.01)
*B41J 2/01* (2006.01)
(Continued)

(52) U.S. Cl.
CPC ............ *B41J 2/04596* (2013.01); *B41J 2/01* (2013.01); *B41J 2/04581* (2013.01);
(Continued)

(58) Field of Classification Search
CPC ...... B41J 2/04596; B41J 2/01; B41J 2/04581; B41J 2/04588; B41J 2/04593;
(Continued)

(56) References Cited

U.S. PATENT DOCUMENTS 9,895,883 B1 * 2/2018 Seto .................... B41J 2/04596
2007/0024652 A1 * 2/2007 Barkley ............... B41J 2/04528
347/10
(Continued)

FOREIGN PATENT DOCUMENTS

EP 3912819 11/2021
JP 2002144563 A * 5/2002 ............. B41J 2/045
(Continued)

OTHER PUBLICATIONS

"Search Report of Europe Counterpart Application", issued on Jun. 12, 2025, p. 1-p. 9.

(Continued)

*Primary Examiner* — Yaovi M Ameh
(74) *Attorney, Agent, or Firm* — JCIPRNET

(57) ABSTRACT

A jetting head control device supplies a non-printing oscillation voltage to which a non-printing oscillation waveform (342) is applied, to a nozzle in the non-printing period, and supplies a printing oscillation voltage to which a printing oscillation waveform (344) is applied, to a non-jetting nozzle that does not jet liquid in a printing period. In the non-printing oscillation waveform, a pulse width $T_W$ is $(3/4)\times T_C<T_W<(5/4)\times T_C$ in a case in which a natural period of a jetting head is denoted by $T_C$, and an indicator of a total amount of oscillation in which a total amount of oscillation, which is an indicator of oscillation of an ink, is larger than a total amount of oscillation in the printing oscillation waveform is applied.

11 Claims, 13 Drawing Sheets

(51) Int. Cl.
*B41J 2/14* (2006.01)
*B41J 2/165* (2006.01)

(52) U.S. Cl.
CPC ....... *B41J 2/04588* (2013.01); *B41J 2/04593* (2013.01); *B41J 2/14233* (2013.01); *B41J 2/165* (2013.01); *B41J 2002/14306* (2013.01); *B41J 2202/10* (2013.01)

(58) Field of Classification Search
CPC .................... B41J 2/14233; B41J 2/165; B41J 2002/14306; B41J 2202/10
See application file for complete search history.

(56) References Cited

U.S. PATENT DOCUMENTS

| | | | |
|---|---|---|---|
| 2011/0175956 | A1 | 7/2011 | Tsukamoto et al. |
| 2019/0299597 | A1 | 10/2019 | Tsukamoto |
| 2019/0389201 | A1 | 12/2019 | Kaneko et al. |

FOREIGN PATENT DOCUMENTS

| | | | | |
|---|---|---|---|---|
| JP | 2008238644 | | 10/2008 | |
| JP | 2012224004 A | * | 11/2012 | ............. B41J 2/045 |
| JP | 2013240947 | | 12/2013 | |
| JP | 5594221 | | 9/2014 | |
| JP | 2019098551 | | 6/2019 | |
| JP | 2019166829 | | 10/2019 | |
| JP | 2019181935 | | 10/2019 | |
| JP | 2020001199 | | 1/2020 | |
| JP | 2020082597 | | 6/2020 | |
| JP | 2021181210 | | 11/2021 | |

OTHER PUBLICATIONS

“International Search Report (Form PCT/ISA/210) of PCT/JP2023/009553,” mailed on Apr. 11, 2023, with English translation thereof, pp. 1-5.
“Written Opinion of the International Searching Authority (Form PCT/ISA/237) of PCT/JP2023/009553,” mailed on Apr. 11, 2023, with English translation thereof, pp. 1-8.

* cited by examiner

JETTING HEAD CONTROL DEVICE, JETTING HEAD CONTROL METHOD, PROGRAM, AND LIQUID JET SYSTEM

CROSS-REFERENCE TO RELATED APPLICATIONS

The present application is a Continuation of PCT International Application No. PCT/JP2023/009553 filed on Mar. 13, 2023 claiming priority under 35 U.S.C § 119 (a) to Japanese Patent Application No. 2022-049140 filed on Mar. 24, 2022. Each of the above applications is hereby expressly incorporated by reference, in its entirety, into the present application.

BACKGROUND OF THE INVENTION

1. Field of the Invention

The present invention relates to a jetting head control device, a jetting head control method, a program, and a liquid jet system.

2. Description of the Related Art

In general, in an ink jet printing device, it is required to suppress the occurrence of banding such as white streaks or dark streaks generated on a printed matter due to flight bending of ink and jetting failure of a nozzle.

In particular, in a case in which single-pass printing is executed, since streaks are easily generated on the printed matter due to the jetting failure of one nozzle, it is required to stably maintain a jetting state of each nozzle for a long period.

It is important to suppress drying of the ink in the nozzle in order to maintain the jetting state. In a case in which an ink containing a solid content such as a pigment and a latex is used, a difference in the jetting state is remarkably exhibited. In a case in which the ink is dried and adheres to an inside of the nozzle, a decrease in a landing position accuracy of the ink, a decrease in the jetting state such as non-jetting of the nozzle, and the like occur, and thus a quality of the printed matter is deteriorated.

In ink jet printing, the ink is actually jetted from the ink jet head, and in addition to a period for executing the printing, there is a period for moving the ink jet head between pages from a waiting position to a printing position, a printing standby period, and a maintenance period of the ink jet head.

In a case in which the ink jet head is located in the air in a period other than a period in which the ink is jetted such as a printing period, and a capping period, the ink jet head is exposed to a low humidity environment outside a cap, and the drying of the ink inside the nozzle is accelerated.

In the related art, although measures for suppressing the solidification of the ink inside the nozzle, such as meniscus oscillation of causing the ink inside the nozzle to oscillate during a period other than the printing period, have been taken, sufficient effects have not been obtained, and it has been difficult to suppress the solidification of the ink inside the nozzle.

JP2013-240947A describes an ink jet recording device that executes meniscus oscillation by selecting a drive waveform for performing meniscus oscillation without jetting an ink for lines before an N line immediately before jetting of the ink in a case in which Nis an integer.

In the device described in JP2013-240947A, a drive waveform corresponding to a leading jetting pixel is changed to a drive waveform with a large jetting amount in advance, and the jetting amount of the ink is increased for the leading jetting pixel, so that a pixel that can be reliably recognized is formed.

JP2020-001199A describes a printer that stirs an ink in a pressure chamber using a micro-vibration pulse that causes a pressure fluctuation in the ink to the extent that the ink is not jetted from a nozzle. In JP2020-001199A, a device of a substrate performs in-printing micro-vibration performed in a printing unit period in which the ink is not jetted from the nozzle during a printing operation, and an out-of-printing micro-vibration performed in a standby state in which the printing operation is not performed.

The micro-vibration pulse applied to the out-of-printing micro-vibration is set to have a larger slope of changes in a voltage and a potential than the micro-vibration pulse applied to the in-printing micro-vibration, because the stirring effect is emphasized more than the printing stability.

JP5594221B describes a liquid droplet jetting device that applies a micro-vibration pulse, which micro-vibrates a meniscus in a nozzle to the extent that the nozzle does not jet a liquid droplet, to micro-vibrate the meniscus in the nozzle during the standby for a recording operation of a recording head.

The micro-vibration pulse described in JP5594221B includes a rectangular wave having a pulse width of 1 AL that changes a channel volume and then returns the channel volume to an original volume in a case in which ½ of an acoustic resonance period of a channel is AL and n is an integer of 1 or more, and is formed of a plurality of pulses having the rectangular wave having a pulse interval of $(n+0.5)\times AL$.

SUMMARY OF THE INVENTION

However, although JP2013-240947A describes a technology for preventing the drying of the ink in the nozzle during the printing, such as a technology related to meniscus oscillation immediately before the jetting, a technology for stabilizing the jetting state over a long period, such as the technology for preventing the drying of the ink in the nozzle during the printing standby, has not been described.

In the device described in JP2020-001199A, the slope of the changes in the voltage and the potential of the micro-vibration pulse applied during the printing standby is increased as compared with the micro-vibration pulse applied during the printing operation, but a sufficient recovery effect of the jetting characteristics may not be obtained simply by increasing the slope of the changes in the voltage and the potential of the micro-vibration pulse is increased.

The micro-vibration pulse described in JP5594221B has the width of the rectangular wave that is ½ times the resonance period, and excites the vibration of the ink that causes the resonance. In this case, it is required to apply a period for canceling the resonance in a case in which the ink is continuously vibrated.

The present invention has been made in view of such circumstances, and an object of the present invention is to provide a jetting head control device, a jetting head control method, a program, and a liquid jet system in which preferred liquid oscillation is realized in a non-jetting nozzle that does not jet liquid.

The present disclosure relates to a jetting head control device that supplies a drive voltage to a jetting head provided with a plurality of nozzles to control the jetting head, the jetting head control device comprising: one or more processors; and one or more memories in which a program to be executed by the one or more processors is stored, in which the one or more processors execute the program to: supply a non-printing oscillation voltage to which a non-printing oscillation waveform for causing liquid to oscillate without jetting the liquid is applied, to the nozzle in a non-printing period in which a printing operation is not executed; and supply a printing oscillation voltage to which a printing oscillation waveform for causing the liquid to oscillate without jetting the liquid is applied, to a non-jetting nozzle that does not jet the liquid in a printing period in which the printing operation is executed, and in the non-printing oscillation waveform, a pulse waveform is applied, a pulse width $T_W$ is represented by $(3/4)\times T_C<T_W<(5/4)\times T_C$ in a case in which a natural period of the jetting head is denoted by $T_C$, and an indicator of a total amount of oscillation in which a total amount of oscillation, which is an indicator of oscillation of an ink, is larger than a total amount of oscillation in the printing oscillation waveform is applied.

With the jetting head control device according to the present disclosure, in a case in which a resonance period of the jetting head is denoted by $T_C$, in the non-printing oscillation voltage, the pulse width $T_W$ represented by $(3/4)\times T_C<T_W<(5/4)\times T_C$ is applied. As a result, the excitation of the resonance with the jetting head is suppressed, and gentle liquid oscillation is realized.

In addition, in the nozzle in the non-printing period, the non-printing oscillation voltage in which the total amount of oscillation of the liquid is larger than the total amount of oscillation of the liquid in the non-jetting nozzle in the printing period is applied. As a result, the suppression of the drying of the liquid is more promoted in the nozzle in the non-printing period than in the non-jetting nozzle in the printing period.

The nozzle may include a flow channel for each nozzle that communicates with a nozzle opening, and a pressure generation element that applies a jetting pressure to the liquid in the flow channel. The supply of the drive voltage to the nozzle means the supply of the drive voltage to the pressure generation element provided in the nozzle.

In the jetting head control device according to another aspect, the number of pulses per unit time in the non-printing oscillation waveform may be applied as the indicator of the total amount of oscillation, and in the non-printing oscillation waveform, the number of pulses per unit time exceeding the number of pulses per unit time in the printing oscillation waveform may be applied.

According to such an aspect, it is possible to generate the liquid oscillation having a larger total amount of oscillation in the non-printing period than the total amount of oscillation in the printing period.

In the jetting head control device according to another aspect, a potential difference with a reference potential in the drive voltage may be applied as the indicator of the total amount of oscillation, and in the non-printing oscillation voltage, a potential difference with the reference potential, which exceeds a potential difference with the reference potential in the printing oscillation voltage, may be applied.

According to such an aspect, it is possible to generate the liquid oscillation having a larger total amount of oscillation in the non-printing period than the total amount of oscillation in the printing period.

In the jetting head control device according to another aspect, the non-printing oscillation waveform may include a plurality of pulse waveforms, and in a case in which Nis an integer of 1 or more and a pulse interval of the plurality of pulse waveforms is denoted by $T_{INT}$, the pulse interval $T_{INT}$ may be represented by $T_{INT}=(N+1/2)\times(T_C/2)$ using the natural period $T_C$.

According to such an aspect, the excitation of the resonance between the jetting head and the liquid is suppressed in the non-printing period. As a result, the occurrence of inadvertent liquid jetting is suppressed.

In the jetting head control device according to another aspect, in the printing oscillation waveform, a pulse width that is the same as a pulse width of the non-printing oscillation waveform may be applied.

According to such an aspect, even for the non-jetting nozzle in the printing period, it is possible to realize the liquid oscillation in which the excitation of the resonance between the jetting nozzle and the liquid is suppressed and the occurrence of the inadvertent liquid jetting is suppressed.

In the jetting head control device according to another aspect, the one or more processors may supply a jetting voltage at which a jetting waveform for jetting the liquid from the nozzle is applied, to the nozzle that jets the liquid in the printing period, and in the printing oscillation waveform, a part of the jetting waveform may be applied.

According to such an aspect, the printing oscillation waveform can be generated without performing an exclusive waveform design of the printing oscillation waveform.

In the jetting head control device according to another aspect, the jetting waveform may include a reverberation suppression waveform for suppressing liquid oscillation in a case in which the liquid is jetted, and in the printing oscillation waveform, the reverberation suppression waveform in the jetting waveform may be applied.

According to such an aspect, the liquid oscillation to which the printing oscillation waveform is applied can suppress the excitation of the resonance between the jetting head and the liquid.

In the jetting head control device according to another aspect, the non-printing oscillation waveform may have a pulse width that is the same as a pulse width of the reverberation suppression waveform.

According to such an aspect, the liquid oscillation to which the non-printing oscillation waveform is applied can also suppress the excitation of the resonance between the jetting head and the liquid, as in the liquid oscillation to which the printing liquid oscillation waveform is applied.

The present disclosure relates to a jetting head control method for supplying a drive voltage to a jetting head provided with a plurality of nozzles to control the jetting head, the jetting head control method comprising: supplying a non-printing oscillation voltage to which a non-printing oscillation waveform for causing liquid to oscillate without jetting the liquid is applied, to the nozzle in a non-printing period in which a printing operation is not executed; and supplying a printing oscillation voltage to which a printing oscillation waveform for causing the liquid to oscillate without jetting the liquid is applied, to a non-jetting nozzle that does not jet the liquid in a printing period in which the printing operation is executed, in which, in the non-printing oscillation waveform and the printing oscillation waveform, a pulse waveform is applied, a pulse width $T_W$ is represented by $(3/4)\times T_C<T_W<(5/4)\times T_C$ in a case in which a natural period of the jetting head is denoted by $T_C$, and an indicator of a total amount of oscillation in which a total amount of oscillation, which is an indicator of oscillation of an ink, is larger than a total amount of oscillation in the printing oscillation waveform is applied.

With the jetting head control method according to the present disclosure, it is possible to obtain the same effects as the effects of the jetting head control device according to the present disclosure. The configuration requirements of the jetting head control device according to another aspect can be applied to the configuration requirements of the jetting head control method according to another aspect.

The present disclosure relates to a program for supplying a drive voltage to a jetting head provided with a plurality of nozzles to control the jetting head, the program causing a computer to implement: a function of supplying a non-printing oscillation voltage to which a non-printing oscillation waveform for causing liquid to oscillate without jetting the liquid is applied, to the nozzle in a non-printing period in which a printing operation is not executed; and a function of supplying a printing oscillation voltage to which a printing oscillation waveform for causing the liquid to oscillate without jetting the liquid is applied, to a non-jetting nozzle that does not jet the liquid in a printing period in which the printing operation is executed, in which, in the non-printing oscillation waveform, a pulse waveform is applied, a pulse width $T_W$ is represented by $(3/4)\times T_C<T_W<(5/4)\times T_C$ in a case in which a natural period of the jetting head is denoted by $T_C$, and an indicator of a total amount of oscillation in which a total amount of oscillation, which is an indicator of oscillation of an ink, is larger than a total amount of oscillation in the printing oscillation waveform is applied.

With the program according to the present disclosure, it is possible to obtain the same effects as the effects of the jetting head control device according to the present disclosure. The configuration requirements of the jetting head control device according to another aspect can be applied to the configuration requirements of the program according to another aspect.

The present disclosure relates to a liquid jet system comprising: a jetting head provided with a plurality of nozzles; and a jetting head control device that supplies a drive voltage to the jetting head to control the jetting head, in which the jetting head control device includes: one or more processors; and one or more memories in which a program to be executed by the one or more processors is stored, the one or more processors execute the program to: supply a non-printing oscillation voltage to which a non-printing oscillation waveform for causing liquid to oscillate without jetting the liquid is applied, to the nozzle in a non-printing period in which a printing operation is not executed; and supply a printing oscillation voltage to which a printing oscillation waveform for causing the liquid to oscillate without jetting the liquid is applied, to a non-jetting nozzle that does not jet the liquid in a printing period in which the printing operation is executed, and in the non-printing oscillation waveform, a pulse waveform is applied, a pulse width $T_W$ is represented by $(3/4)\times T_C<T_W<(5/4)\times T_C$ in a case in which a natural period of the jetting head is denoted by $T_C$, and an indicator of a total amount of oscillation in which a total amount of oscillation, which is an indicator of oscillation of an ink, is larger than a total amount of oscillation in the printing oscillation waveform is applied.

With the liquid jet system according to the present disclosure, it is possible to obtain the same effects as the effects of the jetting head control according to the present disclosure. The configuration requirements of the jetting head control according to another aspect can be applied to the configuration requirements of the liquid jet system according to another aspect.

In the liquid jet system according to another aspect, the jetting head may include a circulation flow channel through which the liquid circulates from each of the plurality of nozzles to an internal flow channel.

According to such an aspect, in a circulation type jetting head in which the liquid in the nozzle circulates and re-dispersion due to diffusion of the liquid can be expected, a high effect of suppressing the drying of the liquid can be obtained.

According to the aspect of the present invention, in a case in which the resonance period of the jetting head is denoted by $T_C$, in the non-printing oscillation voltage, the pulse width $T_W$ represented by $(3/4)\times T_C<T_W<(5/4)\times T_C$ is applied. As a result, the excitation of the resonance with the jetting head is suppressed, and gentle liquid oscillation is realized.

In addition, in the nozzle in the non-printing period, the non-printing oscillation voltage in which the total amount of oscillation of the liquid is larger than the total amount of oscillation of the liquid in the non-jetting nozzle in the printing period is applied. As a result, the suppression of the drying of the liquid is more promoted in the nozzle in the non-printing period than in the non-jetting nozzle in the printing period.

DESCRIPTION OF THE PREFERRED EMBODIMENTS

Figure 1:
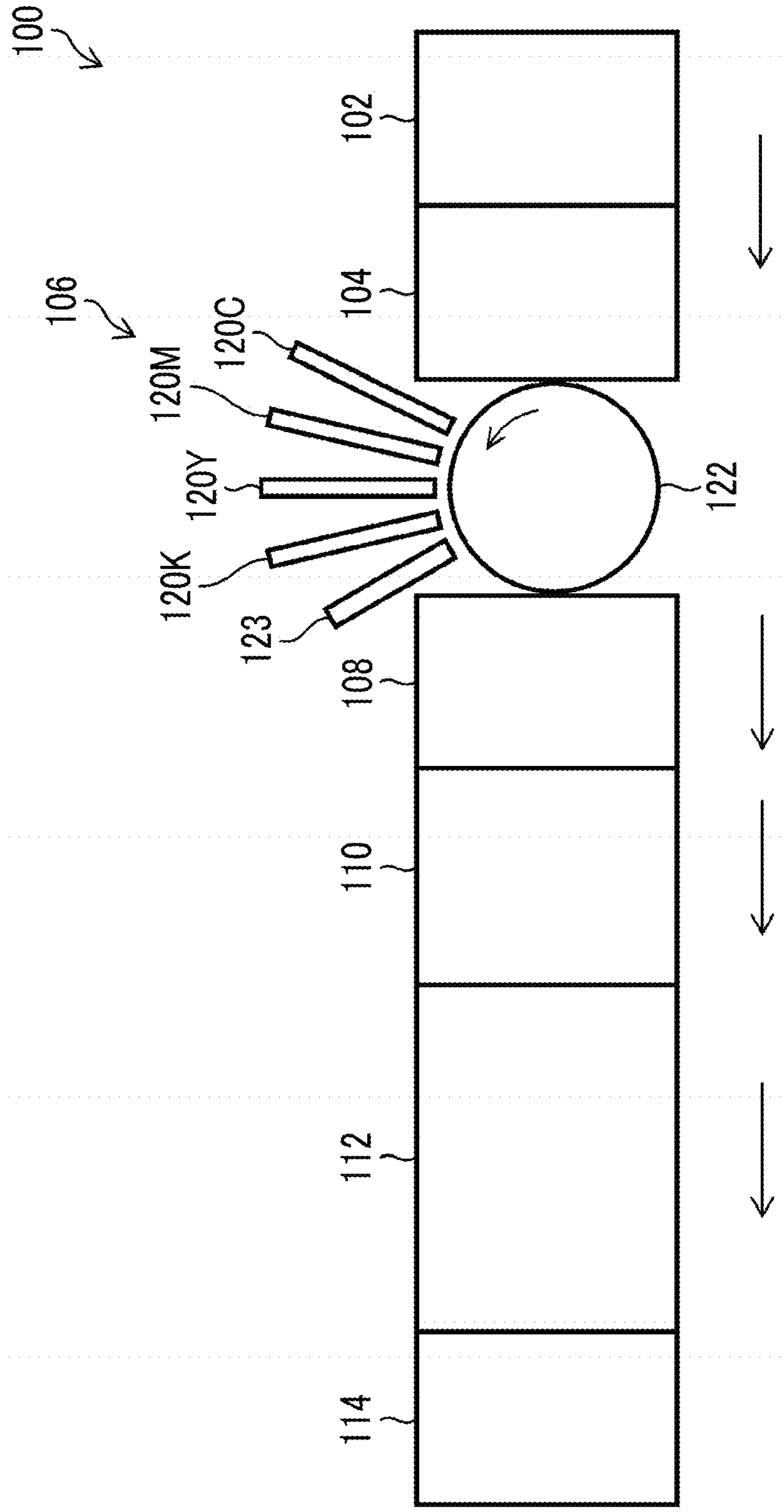
FIG. 1 is a perspective view showing an overall configuration of a printing system according to an embodiment.

Hereinafter, the detailed description of preferred embodiments of the present invention will be made with reference to the accompanying drawings. In the present specification, the same reference numeral will be given to the same configuration element and the duplicate description thereof will be omitted as appropriate.

Configuration Example of Liquid Jet System According to Embodiment

[Overall Configuration]

Figure 2:
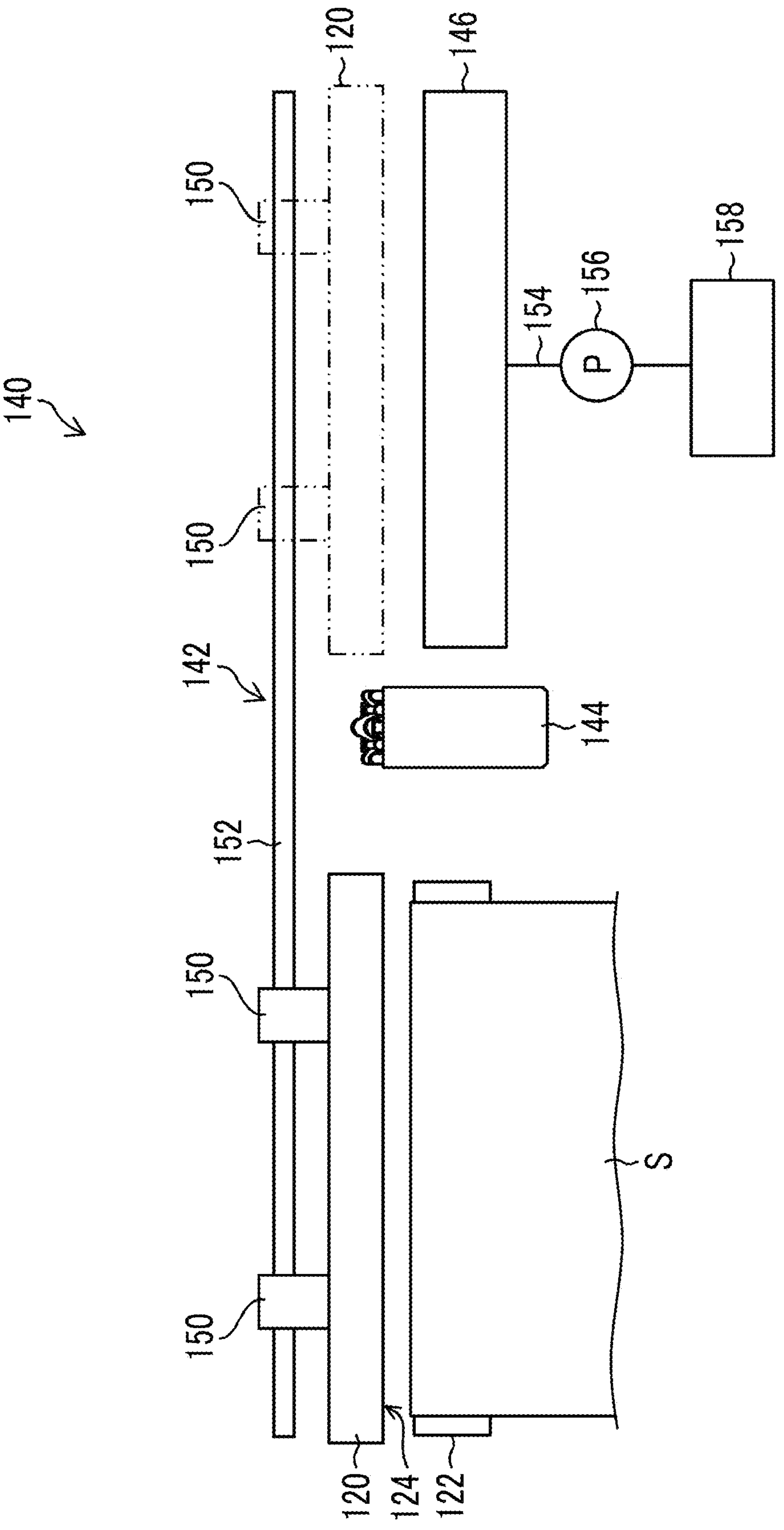
FIG. 2 is a schematic view showing a configuration example of a maintenance device applied to the printing system shown in FIG. 1.

FIG. 1 is a perspective view showing an overall configuration of a printing system according to the embodiment. A printing system 100 is provided with a printing device 106 of a digital type that prints a color image on a substrate by applying single-pass printing. It should be noted that the substrate is shown in FIG. 2 with reference numeral S.

As the substrate, a paper medium such as single-wafer paper and continuous paper, a sheet-like metal medium, a cloth medium such as a cloth, and the like may be applied. A soft package such as a plastic film may be applied to the substrate. The substrate may be a single layer or a plurality of layers superimposed on each other. The substrate may have a roll-to-roll continuous form or a single-wafer form cut to a defined length. It should be noted that the substrate will be referred to as a medium, media, a sheet, a film, a substrate, or the like in some cases.

The printing system 100 comprises a substrate supply device 102, a first intermediate transport device 104, the printing device 106, a second intermediate transport device 108, an inspection device 110, a drying device 112, and an accumulation device 114.

The printing system 100 further comprises a maintenance device. In FIG. 1, the maintenance device is not shown. The maintenance device is shown in FIG. 2 with reference numeral 140. Hereinafter, each of the units will be described in detail.

[Substrate Supply Device]

In a case in which the substrate has a continuous form, the substrate supply device 102 includes a roll accommodation portion that accommodates a roll around which the substrate is wound. In a case in which the substrate has a single-wafer form, the substrate supply device 102 comprises a tray in which the substrate is accommodated. The substrate supply device 102 supplies the substrate to the first intermediate transport device 104 in response to printing control of the printing device 106. The substrate supply device 102 may comprise a correction mechanism that corrects a posture of the substrate.

[First Intermediate Transport Device]

The first intermediate transport device 104 delivers the substrate supplied from the substrate supply device 102 to the printing device 106. A known configuration corresponding to the form of the substrate may be applied to the first intermediate transport device 104. It should be noted that an arrow line from the substrate supply device 102 toward the first intermediate transport device 104 indicates a substrate transport direction.

[Printing Device]

The printing device 106 comprises an ink jet head 120C, an ink jet head 120M, an ink jet head 120Y, and an ink jet head 120K. The ink jet head 120C, the ink jet head 120M, the ink jet head 120Y, and the ink jet head 120K are disposed in the order described above from an upstream side along the substrate transport direction.

The ink jet head 120C jets cyan ink. The ink jet head 120M jets magenta ink. The ink jet head 120Y jets yellow ink. The ink jet head 120K jets black ink.

A line head in which a plurality of nozzles are disposed in a substrate width direction over a length equal to or larger than the total length of the substrate may be applied to the ink jet head 120C or the like. Examples of the configuration example of the line head include a configuration in which a plurality of head modules are connected to each other. The two-dimensional disposition such as matrix disposition is applied to the plurality of nozzles provided in the ink jet head 120C or the like.

In the ink jet head 120C and the like, a piezoelectric jet method comprising a piezoelectric element as a jetting pressure element that generates a jetting pressure may be applied. For the ink jet head 120C and the like, a thermal method of jetting the ink by using a film boiling phenomenon of the ink may be applied.

The printing device 106 forms the color image on the substrate by using color ink such as cyan ink. The printing device 106 may comprise an ink jet head that jets special color ink other than process ink, such as cyan, such as an ink jet head that forms a white image as a background image of a color image by using white ink.

Figure 3:
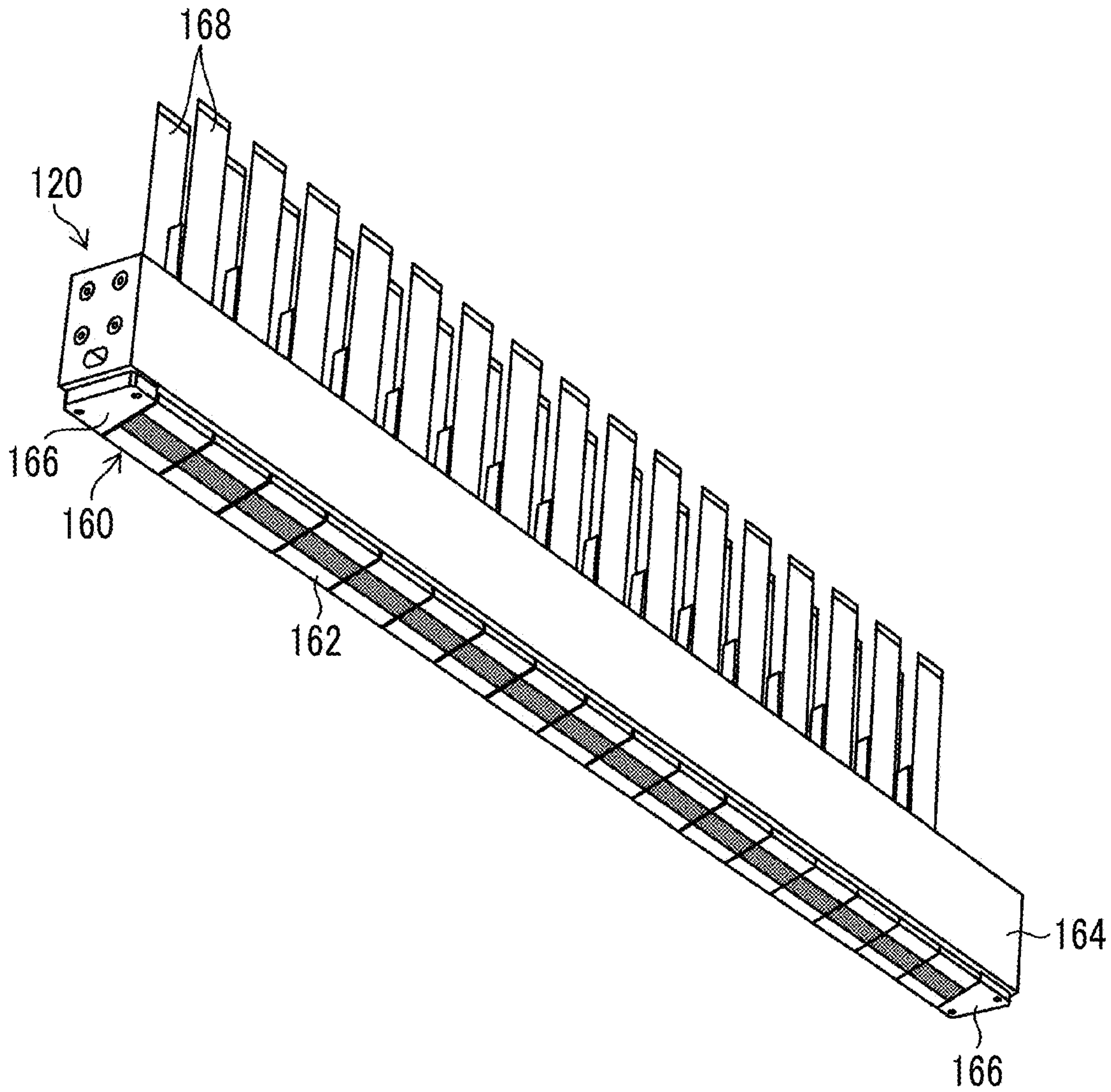
FIG. 3 is a perspective view showing a configuration example of an ink jet head.

A configuration example shown in FIG. 3 can be applied to each of the ink jet head 120C, the ink jet head 120M, the ink jet head 120Y, and the ink jet head 120K. A posture in which a normal line of the nozzle surface intersects a vertical direction is applied to the ink jet head 120C and the like.

It should be noted that each of the ink jet head 120C, the ink jet head 120M, the ink jet head 120Y, and the ink jet head 120K according to the embodiment is an example of a jetting head.

The printing device 106 comprises a printing drum 122. The printing drum 122 has a cylindrical shape, and is supported to be rotatable with a central axis as a rotation axis. The printing drum 122 comprises, on a peripheral surface thereof, a substrate support area that supports the substrate. It should be noted that the substrate support area is not shown.

A rotation shaft of the printing drum 122 is connected to a motor (not shown) via a drive mechanism (not shown). In a case in which the motor is rotated, the printing drum 122 rotates in a direction indicated by an arrow line. In a case in which the printing drum 122 is rotated, the substrate supported on the peripheral surface of the printing drum 122 is transported along a rotation direction of the printing drum 122.

A plurality of suction holes are formed in the substrate support area. The plurality of suction holes are disposed based on a defined pattern. The plurality of suction holes communicate with a suction flow channel (not shown). The suction flow channel is connected to a suction pump (not shown). The suction pump is operated to support the substrate by suction on the peripheral surface of the printing drum 122 using the negative pressure generated in the plurality of suction holes.

A transport form of the substrate in the printing device 106 is not limited to the transport form using the printing drum 122. For example, a transport form using a transport belt and a transport form using a plurality of rollers can be applied.

The printing device 106 comprises an in-line sensor 123. The in-line sensor 123 is disposed at a position on the downstream side of the ink jet head 120K in the substrate transport direction. The in-line sensor 123 reads a test pattern printed on the substrate and outputs a reading signal of the test pattern. The printing device 106 detects an abnormality of the nozzle provided in the ink jet head 120C and the like based on the reading signal of the test pattern.

The in-line sensor 123 comprises an image sensor that reads the image printed on the substrate. A CCD image sensor, a CMOS image sensor, and the like can be applied to the image sensor. The in-line sensor 123 has an imaging region corresponding to an entire width of the substrate in the substrate width direction. The in-line sensor 123 may be provided with an optical member, such as a condenser lens. It should be noted that CCD is an abbreviation for a charge coupled device. CMOS is an abbreviation for a complementary metal oxide semiconductor.

[Second Intermediate Transport Device]

The second intermediate transport device 108 delivers the substrate delivered from the printing drum 122 to the inspection device 110. The same configuration as the configuration of the first intermediate transport device 104 may be applied to the second intermediate transport device 108. It should be noted that an arrow line shown in the second intermediate transport device 108 represents the substrate transport direction of the second intermediate transport device 108.

[Inspection Device]

The inspection device 110 comprises an imaging device that images the print image printed on the substrate. The inspection device 110 outputs read data of the print image. The inspection device 110 may detect a defect in the print image based on the read data of the print image. It should be noted that an arrow line shown in the inspection device 110 represents the substrate transport direction in the inspection device 110.

[Drying Device]

The drying device 112 performs drying processing on the substrate on which the print image has been printed. The drying device 112 comprises a heater and a fan, and may adopt a configuration in which hot air is blown onto the substrate on which the printing has been performed. The drying device 112 comprises a drying and transport unit that transports the substrate. As a transport form of the substrate to which the drying and transport unit is applied, a known transport form such as drum transport, belt transport, and roller transport may be applied. It should be noted that an arrow line shown in the drying device 112 indicates the substrate transport direction in the drying device 112.

The accumulation device 114 accommodates the substrate delivered from the drying device 112. In a case in which the substrate has a continuous form, the accumulation device 114 comprises a roll accommodation portion that accommodates a roll around which the substrate is wound. In a case in which the substrate has a single-wafer form, the accumulation device 114 comprises a tray in which the substrate is accommodated.

A two-liquid method in which a treatment liquid that aggregates or insolubilizes a coloring material contained in the ink is used may be applied to the printing system 100. That is, the printing system 100 can adopt an aspect in which a treatment liquid application device is provided, which applies the treatment liquid to the substrate before the printing, in which the treatment liquid application device is disposed at a position on the upstream side of the printing device 106 in the substrate transport direction.

In the aspect in which the treatment liquid application device is provided, a treatment liquid drying device that dries the treatment liquid applied to the substrate may be provided. The treatment liquid drying device is disposed at a position on the downstream side of the treatment liquid application device in the substrate transport direction, that is, at a position on the upstream side of the printing device 106 in the substrate transport direction. It should be noted that the printing system 100 according to the embodiment is an example of a liquid jet system.

Configuration Example of Maintenance Device

FIG. 2 is a schematic view showing a configuration example of the maintenance device applied to the printing system shown in FIG. 1. The maintenance device 140 shown in FIG. 2 is disposed side by side with the printing device 106 with respect to a direction penetrating the paper surface of FIG. 1. In the following description, the ink jet head 120C and the like shown in FIG. 1 will be collectively referred to as an ink jet head 120 in some cases.

The maintenance device 140 shown in FIG. 2 comprises a head moving device 142, a wiping device 144, and a cap device 146. The head moving device 142 moves the ink jet head 120 between a printing position and a maintenance position.

FIG. 2 shows a configuration in which the head moving device 142 comprises a carriage 150 coupled to the ink jet head 120 and a guide 152 that supports the carriage 150, as a configuration example. It should be noted that, in FIG. 2, a linear moving mechanism connected to the carriage 150, a motor connected to the linear moving mechanism, and the like are not shown.

The printing position is a position of the ink jet head 120 that performs the printing on a substrate S by causing the ink jet head 120 to jet the ink. That is, the printing position is a position of the ink jet head 120 at which an outer peripheral surface of the printing drum 122 and a nozzle surface 124 of the ink jet head 120 face each other. FIG. 2 shows the ink jet head 120 located at the printing position by using a solid line.

The maintenance position is a position of the ink jet head 120 at which the maintenance of the ink jet head 120 is performed. The maintenance of the ink jet head 120 includes the wiping of the nozzle surface 124 to which the wiping device 144 is applied, the purge in which the jetting element of each nozzle is operated to discharge the ink from the nozzle opening to the cap device 146, and the capping for moisturizing the nozzle surface 124 of the ink jet head 120 by using the cap device 146.

The cap device 146 is connected to a discharge tank 158 via a discharge flow channel 154 and a discharge pump 156. The ink discharged to the cap device 146 is fed to the discharge tank 158 by operating the discharge pump 156.

FIG. 2 shows the ink jet head 120 at an execution position of the maintenance to which the cap device 146 is applied among the maintenance positions, by using a one-dot chain line. The maintenance position includes a position at which the wiping of the nozzle surface 124 is performed by using the wiping device 144.

The wiping device 144 causes a web, which is a sheet-like wiping member to travel, and brings the traveling web into contact with the nozzle surface 124 to wipe the nozzle surface 124 of the ink jet head 120 that moves along the guide 152.

The maintenance device 140 comprises a head lifting/lowering device. The head lifting/lowering device lifts and lowers the ink jet head 120 at the printing position. The head lifting/lowering device lifts and lowers the ink jet head 120 in a case in which the purge processing of the ink jet head 120 is performed and in a case in which the moisturizing processing of the ink jet head 120 is performed by using the cap device. It should be noted that the head lifting/lowering device is not shown.

The lifting of the ink jet head 120 is the movement of the ink jet head 120 in the upward direction of the vertical direction. The lowering of the ink jet head 120 is the movement of the ink jet head 120 in the downward direction of the vertical direction.

Configuration Example of Ink Jet Head

FIG. 3 is a perspective view showing a configuration example of the ink jet head. The ink jet head 120 shown in FIG. 3 has a structure in which a plurality of head modules 160 are connected in a line along a longitudinal direction of the ink jet head 120. The plurality of head modules 160 are integrated and supported by using a head frame 164.

The ink jet head 120 is a line head in which the plurality of nozzles are disposed over a length corresponding to the entire width of the substrate S in the substrate width direction. It should be noted that the nozzle is not shown in FIG. 3. The nozzle is shown with a reference numeral 180 in FIG. 5.

A plan shape of a nozzle surface 162 of the head module 160 is a parallel quadrilateral. Both ends of the head frame 164 are attached with dummy plates 166. The plan shape of the nozzle surface 162 of the ink jet head 120 is a rectangular shape as an entirety in which the head module 160 and the dummy plate 166 are combined. It should be noted that the nozzle surface 162 of the head module 160 shown in FIG. 3 is a configuration element of the nozzle surface 124 of the ink jet head 120 shown in FIG. 2.

The head module 160 is attached with a flexible substrate 168. The flexible substrate 168 is a wiring member that delivers a drive voltage supplied to the head module 160. One end of the flexible substrate 168 is electrically connected to the head module 160, and the other end thereof is electrically connected to a drive voltage supply circuit. It should be noted that the drive voltage supply circuit is not shown.

Each of the plurality of head modules 160 provided in the ink jet head 120 can be associated with a module number representing a position of the head module 160 in the order from the head module 160 disposed at one end of the ink jet head 120.

Figure 4:
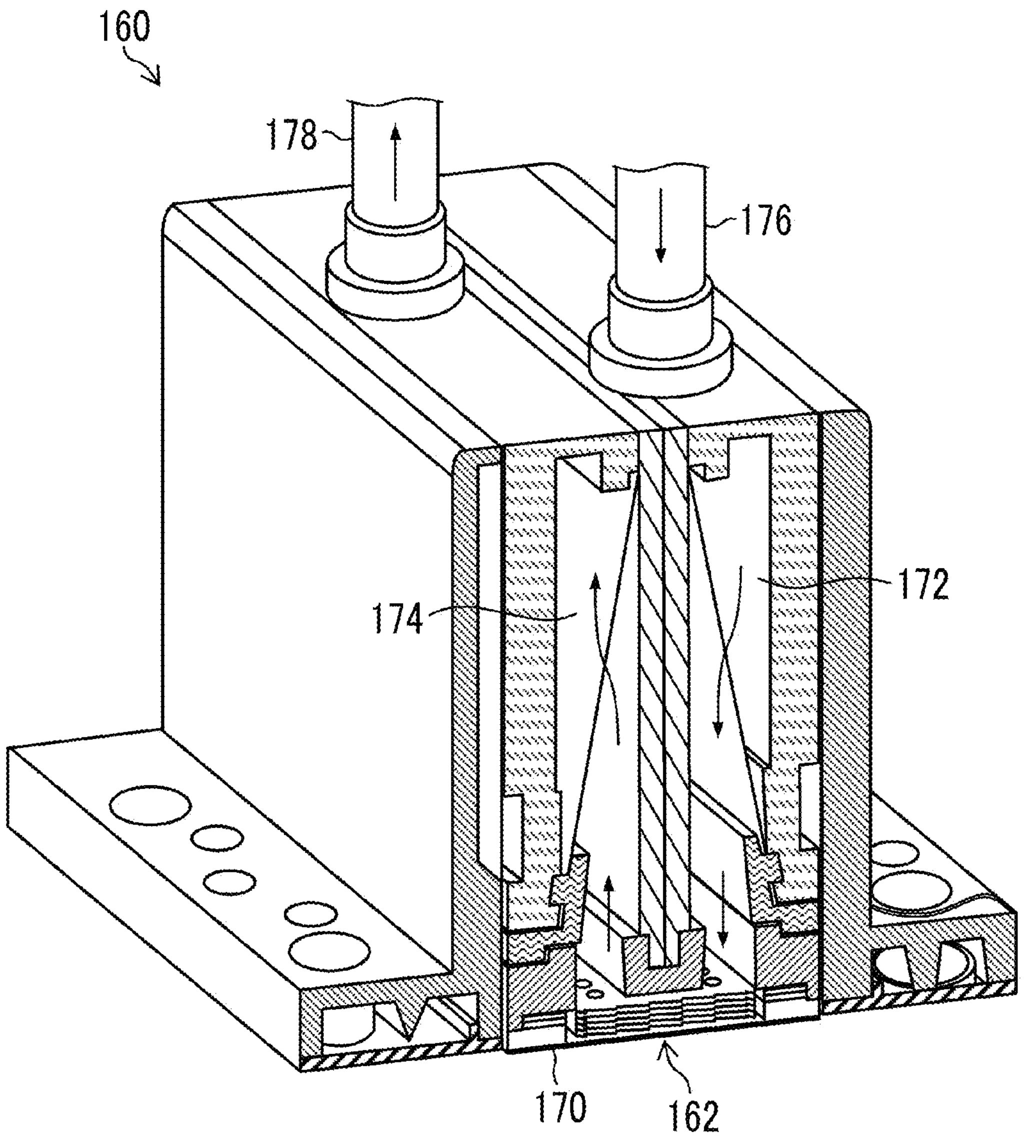
FIG. 4 is a perspective view of a head module and is a view including a partial cross-sectional view.

FIG. 4 is a perspective view of the head module and is a view including a partial cross-sectional view. The head module 160 includes an ink supply unit consisting of an ink supply chamber 172, an ink circulation chamber 174, and the like on the upper surface side in FIG. 4 which is opposite to the nozzle surface 162 of the nozzle plate 170.

The ink supply chamber 172 is connected to a buffer tank via a supply-side individual flow channel 176. The ink circulation chamber 174 is connected to the buffer tank via a recovery-side individual flow channel 178.

Figure 5:
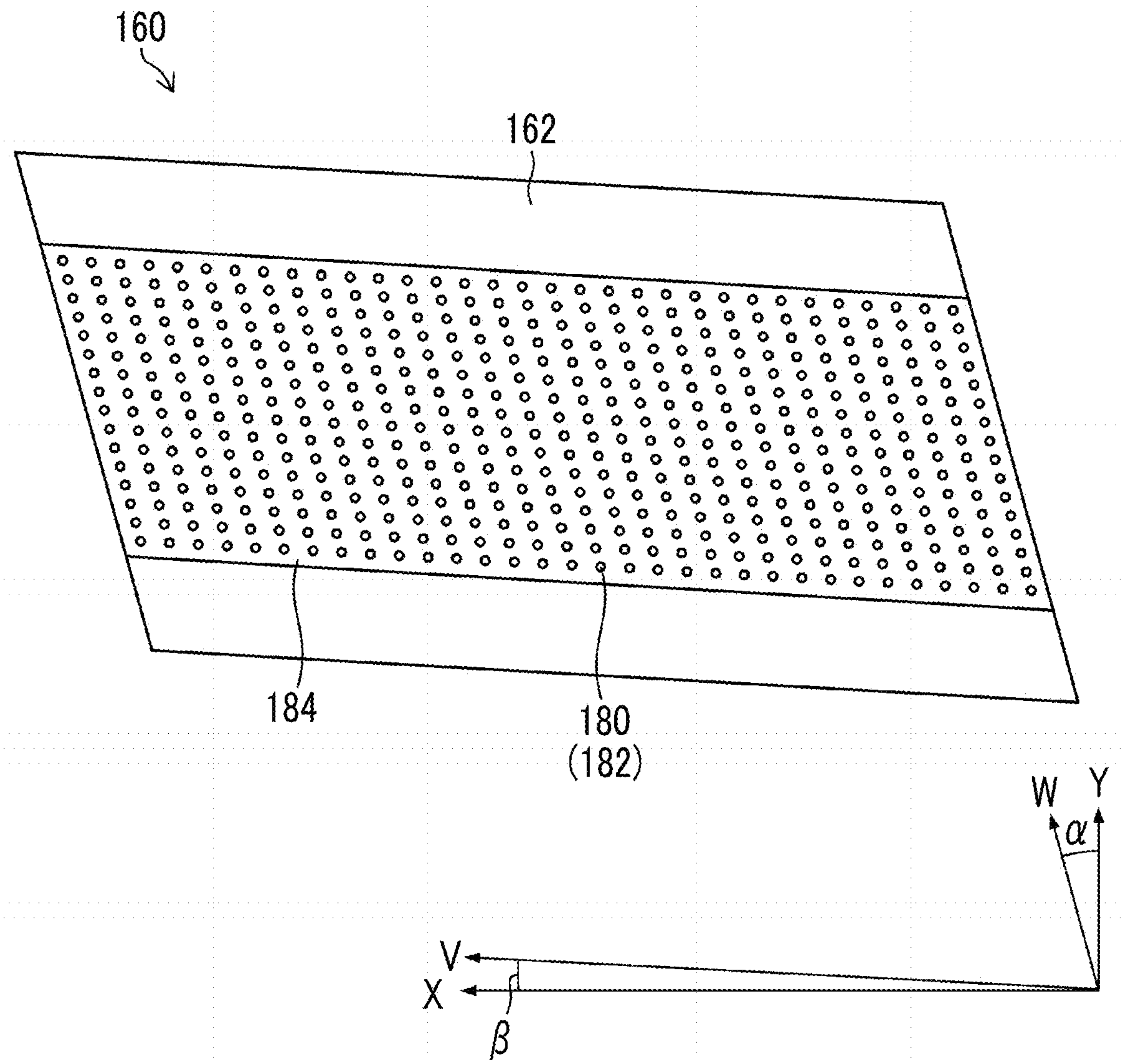
FIG. 5 is a plan view showing a nozzle disposition example of the ink jet head shown in FIG. 3.

FIG. 5 is a plan view showing a nozzle disposition example of the ink jet head shown in FIG. 3. A central portion of the nozzle surface 162 of the head module 160 comprises a nozzle disposition portion 184 having a strip shape. The nozzle disposition portion 184 functions as a substantial nozzle surface 162.

A plurality of nozzles 180 are disposed in the nozzle disposition portion 184. The nozzle 180 includes a nozzle opening 182 formed on the nozzle surface 162. In the following description, the disposition of the nozzles 180 may also be read as the disposition of the nozzle openings 182.

The head module 160 has a plane shape that is a parallel quadrilateral having an end surface on a long side along a V direction having a slope of an angle β with respect to the substrate width direction shown by a reference numeral X and an end surface on a short side along a W direction having a slope of an angle α with respect to the substrate transport direction shown by a reference numeral Y.

In the head module 160, the plurality of nozzles 180 are disposed in a matrix in a row direction along the V direction and a column direction along the W direction. The nozzles 180 may be disposed along the row direction along the substrate width direction and the column direction obliquely intersecting the substrate width direction.

In a case of the ink jet head 120 in which the plurality of nozzles 180 are disposed in a matrix, a projection nozzle line in which each nozzle 180 in the matrix disposition is projected along a nozzle line direction can be considered to be equivalent to one nozzle line in which the respective nozzles 180 are disposed at substantially equal intervals at a density that achieves the maximum recording resolution for the nozzle line direction. The projection nozzle line is a nozzle line in which each nozzle 180 in the matrix disposition is orthographically projected along the nozzle line direction.

The substantially equal interval means that the dropping points that can be recorded in the printing device are substantially equal intervals. For example, a case in which the intervals are slightly different in consideration of at least any one of a manufacturing error or movement of liquid droplets on the substrate due to the impact interference is also included in the concept of the equal interval. The projection nozzle line corresponds to a substantial nozzle line. In consideration of the projection nozzle line, each nozzle 180 can be associated with a nozzle number representing a nozzle position in the order of disposition of the projection nozzles arranged along the nozzle line direction.

It should be noted that, although FIG. 5 shows, as an example, the ink jet head 120 in which the plurality of nozzles are disposed in a matrix, one-line disposition may be applied to the plurality of nozzles, or zigzag disposition in two lines may be applied to the plurality of nozzles.

A substantial density of the nozzles 180 in the substrate width direction corresponds to a printing resolution in the substrate width direction. Examples of the printing resolution in the substrate width direction include 1200 dots per inch. Inch for each dot representing the number of dots per inch can be referred to as dpi by using an abbreviation for dot per inch.

Figure 6:
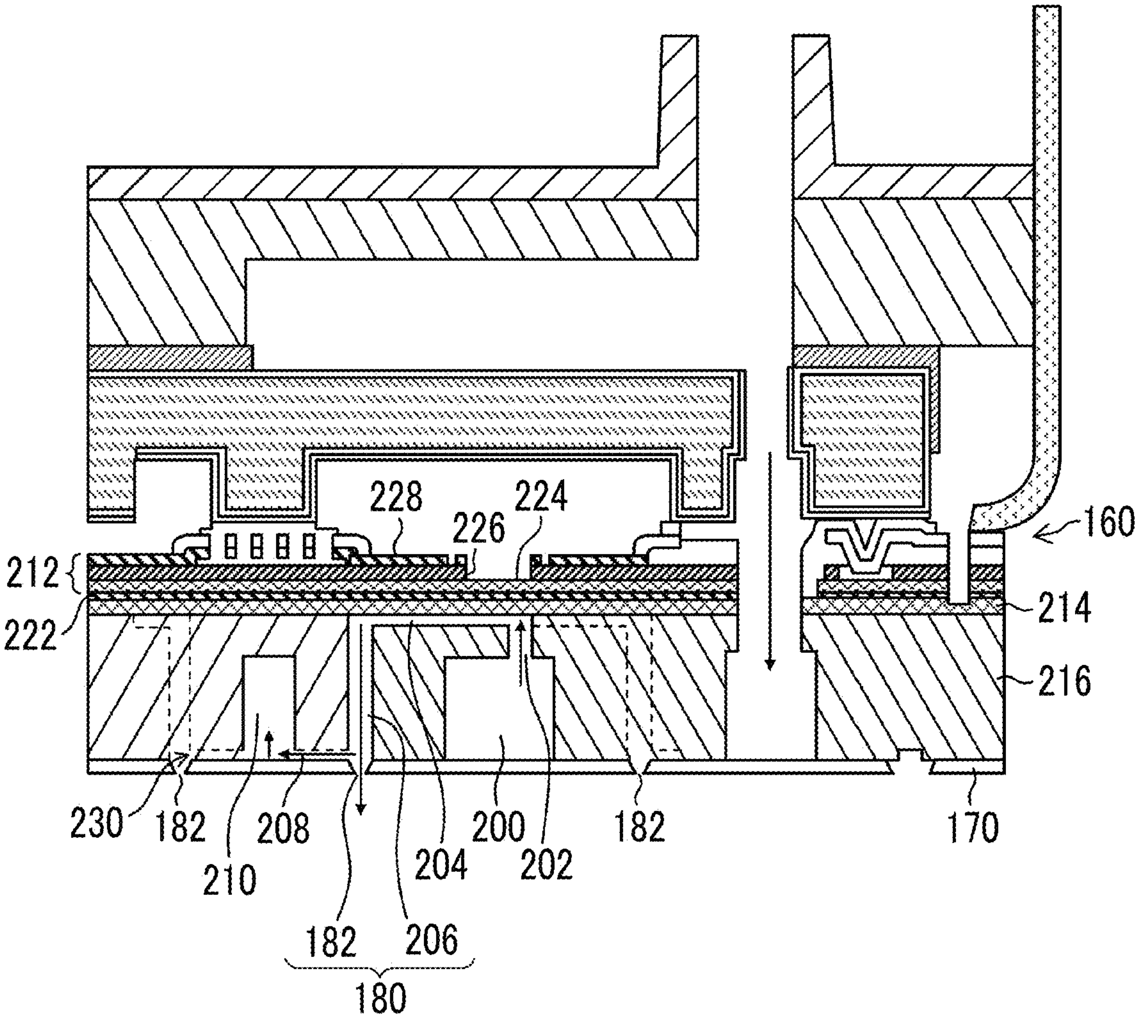
FIG. 6 is a cross-sectional view showing an internal structure of the head module.

FIG. 6 is a cross-sectional view showing an internal structure of the head module. The head module 160 comprises an ink supply path 200, an individual supply path 202, a pressure chamber 204, a nozzle communication path 206, an individual circulation flow channel 208, a common circulation flow channel 210, a piezoelectric element 212, and a vibration plate 214.

The ink supply path 200, the individual supply path 202, the pressure chamber 204, the nozzle communication path 206, the individual circulation flow channel 208, and the common circulation flow channel 210 are formed in a flow channel structure 216. The nozzle 180 includes the nozzle opening 182 and the nozzle communication path 206. The nozzle communication path 206 is a flow channel constituting a jetting element, and corresponds to a flow channel communicating with the nozzle opening 182.

The individual supply path 202 is a flow channel that connects the pressure chamber 204 and the ink supply path 200. The nozzle communication path 206 is a flow channel that connects the pressure chamber 204 and the nozzle opening 182. The individual circulation flow channel 208 is a flow channel that connects the nozzle communication path 206 and the common circulation flow channel 210.

The vibration plate 214 is disposed on the flow channel structure 216. The piezoelectric element 212 is disposed on the vibration plate 214 via an adhesive layer 222. The piezoelectric element 212 has a laminated structure of a lower electrode 224, a piezoelectric layer 226, and an upper electrode 228. It should be noted that the lower electrode 224 may be referred to as a common electrode, and the upper electrode 228 may be referred to as an individual electrode.

The upper electrode 228 is an individual electrode that is patterned corresponding to a shape of each pressure chamber 204, and the piezoelectric element 212 is provided in each pressure chamber 204. The piezoelectric element 212 corresponds to an energy generation element constituting the jetting element.

The ink supply path 200 communicates with the ink supply chamber 172 shown in FIG. 4. The ink is supplied from the ink supply path 200 to the pressure chamber 204 via the individual supply path 202. The drive voltage is applied to the upper electrode 228 of the piezoelectric element 212 as the operation target in accordance with the image data, the piezoelectric element 212 and the vibration plate 214 are deformed, and the volume of the pressure chamber 204 is changed.

The head module 160 jets the ink liquid droplet from the nozzle opening 182 via the nozzle communication path 206 in response to the pressure change accompanying the change in the volume of the pressure chamber 204. It should be noted that the image data can be referred to as printing data, printing base data, or the like.

The pressure chamber 204 corresponding to each of the nozzle openings 182 has a planar shape of a substantially square shape, an outlet port to the nozzle opening 182 is disposed at one of both corner portions on a diagonal line, and the individual supply path 202, which is an inlet port of the ink, is disposed at the other thereof. The shape of the pressure chamber is not limited to square. The planar shape of the pressure chamber may be various forms such as a rectangle such as a rhombus and a quadrangle, a pentagon, a hexagon or other polygons, a circle, and an ellipse.

The nozzle communication path 206 is formed with a circulation outlet 230. The nozzle communication path 206 communicates with the individual circulation flow channel 208 via the circulation outlet 230. Among the inks held in the nozzle 180, an ink that is not used for jetting is recovered in the common circulation flow channel 210 via the individual circulation flow channel 208.

The common circulation flow channel 210 communicates with the ink circulation chamber 174 shown in FIG. 4. The ink is recovered in the common circulation flow channel 210 via the individual circulation flow channel 208. As a result, the thickening of the ink held in the nozzle 180 during a non-jetting period is prevented.

FIG. 6 shows the piezoelectric element 212 having a structure that is individually separated corresponding to each of a plurality of nozzles 180. Of course, a structure may be applied in which the piezoelectric layer 226 is integrally formed with respect to the plurality of nozzles 180, the individual electrodes are formed corresponding to each of the plurality of nozzles 180, and an active region is formed in each of the nozzles 180.

It should be noted that the individual circulation flow channel 208 according to the embodiment is an example of a circulation flow channel. In addition, the ink supply path 200, the individual supply path 202, the pressure chamber 204, the nozzle communication path 206, and the common circulation flow channel 210 are examples of configuration components of an internal flow channel of the jetting head.

[Electric Configuration of Printing System]

Figure 7:
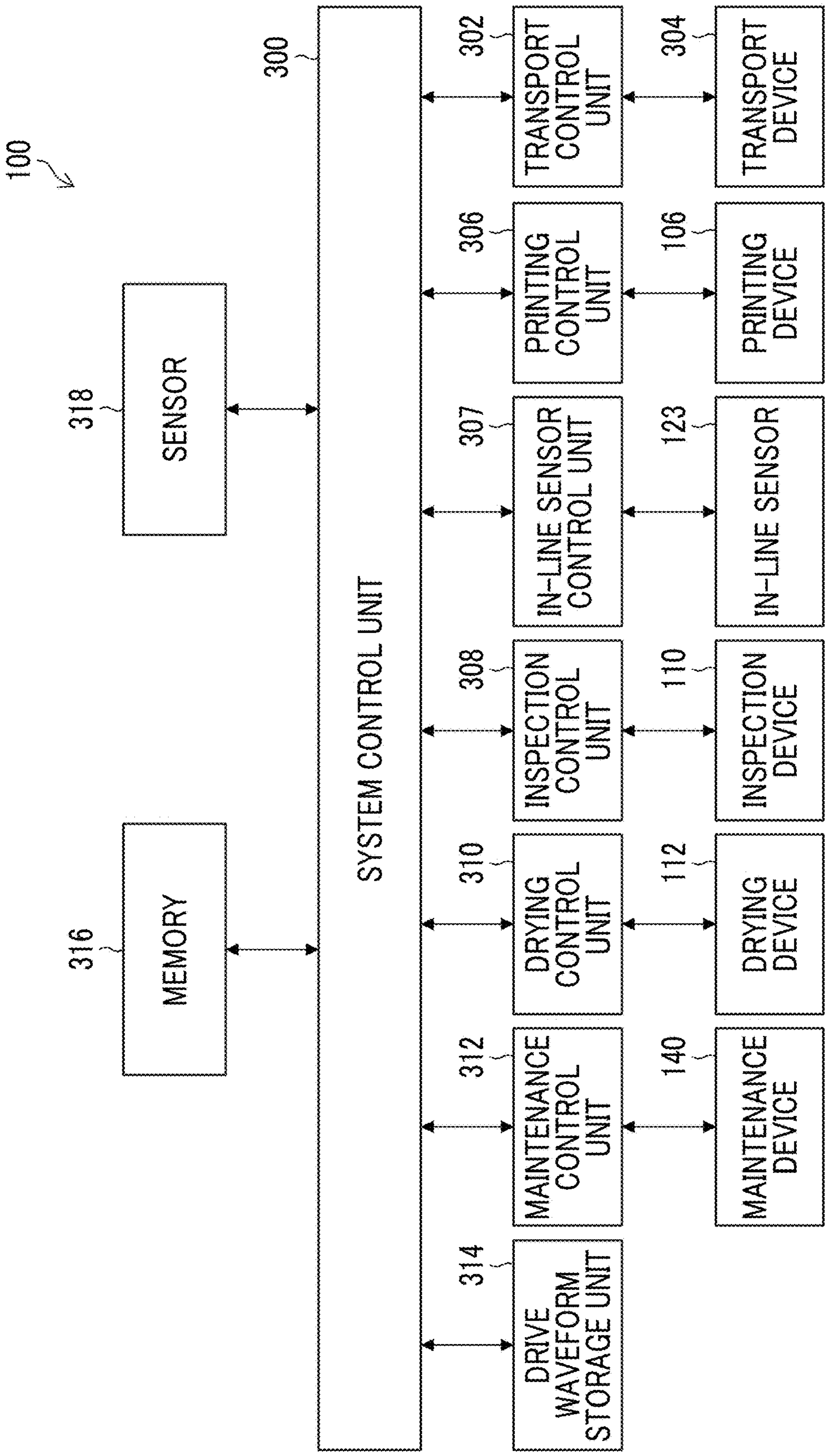
FIG. 7 is a functional block diagram showing an electric configuration of the printing system shown in FIG. 1.

FIG. 7 is a functional block diagram showing an electric configuration of the printing system shown in FIG. 1. The printing system 100 comprises a system control unit 300, a transport control unit 302, a printing control unit 306, an in-line sensor control unit 307, an inspection control unit 308, a drying control unit 310, and a maintenance control unit 312. The printing system 100 comprises a memory 316 and a sensor 318.

The system control unit 300 comprehensively controls an overall operation of the printing system 100. The system control unit 300 transmits command signals to various control units. The system control unit 300 functions as a memory controller that controls the storage of data in a memory 316 and the read of data from the memory 316.

The system control unit 300 acquires a sensor signal transmitted from a sensor 318 and transmits the command signals based on the sensor signal to various control units. The sensor 318 includes a position detection sensor, a temperature sensor, and the like provided in each unit of the printing system 100.

The transport control unit 302 sets a transport condition based on the command signal transmitted from the system control unit 300, and controls an operation of a transport device 304 based on the set transport condition. The transport device 304 shown in FIG. 7 includes the drying transport device provided in the first intermediate transport device 104, the printing drum 122, and the drying device 112 shown in FIG. 1. The transport device 304 may include the substrate supply device 102 and the accumulation device 114.

The printing control unit 306 sets a printing condition based on the command signal transmitted from the system control unit 300 and controls an operation of the printing device 106 based on the set printing condition. That is, the printing control unit 306 performs color separation processing, color conversion processing, correction processing of each processing, and halftone processing on the printing data to generate halftone data for each color. The printing control unit 306 generates the drive voltage to be supplied to the ink jet head 120 based on the halftone data for each color, and supplies the drive voltage to the ink jet head 120.

The printing control unit 306 determines whether the period is a printing period in which the printing operation is executed, or a non-printing period in which the printing operation is not executed. The printing control unit 306 supplies a printing oscillation voltage for causing the meniscus to oscillate to all the nozzles 180 in a case of the non-printing period.

The printing control unit 306 supplies a non-printing oscillation voltage for causing the meniscus to oscillate to a non-jetting nozzle that does not jet the ink in the printing period in which the printing operation is executed. In addition, the printing control unit 306 supplies a jetting drive voltage for jetting the ink, to the jetting nozzle that jets the ink in the printing period in which the printing operation is executed. It should be noted that details of the drive voltage supplied to the ink jet head 120 will be described below.

The printing control unit 306 executes jetting correction of the ink jet head 120 for an abnormal nozzle specified based on the read data of the test pattern transmitted from the in-line sensor 123. Examples of the jetting correction include mask processing on the non-jetting nozzle and substitute jetting using a nozzle in the vicinity of the non-jetting nozzle with respect to the printing position of the non-jetting nozzle.

The in-line sensor control unit 307 sets a reading condition of the in-line sensor 123 based on the command signal transmitted from the system control unit 300, and controls the reading of the test pattern in which the in-line sensor 123 is used.

The in-line sensor control unit 307 acquires the read data of the test pattern transmitted from the in-line sensor 123. The printing system 100 specifies the abnormal nozzle based on the read data of the test pattern acquired via the in-line sensor control unit 307. Information on the abnormal nozzle is transmitted to the printing control unit 306.

The inspection control unit 308 sets an inspection condition based on the command signal transmitted from the system control unit 300, and controls an operation of the inspection device 110 based on the set inspection condition. The inspection control unit 308 acquires an inspection result of the print image representing the quality of the print image from the inspection device 110.

The system control unit 300 sorts the print image of a good quality and the print image of a poor quality in the accumulation device 114 shown in FIG. 1 based on the inspection result of the print image acquired from the inspection device 110.

The drying control unit 310 sets a processing condition of main drying processing based on the command signal transmitted from the system control unit 300, and controls an operation of the drying device 112 based on the set processing condition.

The maintenance control unit 312 sets a maintenance condition based on the command signal transmitted from the system control unit 300, and controls an operation of the maintenance device 140 based on the set maintenance condition.

The maintenance control unit 312 functions as a wiping control unit that controls an operation of the wiping device 144 shown in FIG. 2 and a cap control unit that controls an operation of the cap device 146. In addition, the maintenance control unit 312 functions as a head moving control unit that controls an operation of the head moving device 142 and a head lifting/lowering control unit that controls an operation of the head lifting/lowering device.

The printing system 100 comprises a drive waveform storage unit 314. The drive waveform storage unit 314 stores a drive waveform representing a drive voltage applied to jetting control of the ink jet head 120.

The drive waveform is commonly used for all the nozzles 180. The drive waveform includes a jetting waveform, a non-printing oscillation waveform, and a printing oscillation waveform. The jetting waveform is applied to a waveform of the jetting drive voltage supplied to the nozzle 180 that jets the ink.

The non-printing oscillation waveform and the printing oscillation waveform are applied to the waveform of the oscillation voltage supplied to the nozzle 180 that does not jet the ink. The non-printing oscillation waveform is applied to the non-printing oscillation voltage supplied to all the nozzles 180 in the non-printing period. The printing oscillation waveform is applied to the printing oscillation voltage supplied to the non-jetting nozzle in the printing period.

The memory 316 can store various data, parameters, and programs applied to the printing system 100. The system control unit 300 controls an operation of the printing system 100 with reference to various data stored in the memory 316. The drive waveform storage unit 314 may be a configuration element of the memory 316.

Figure 8:
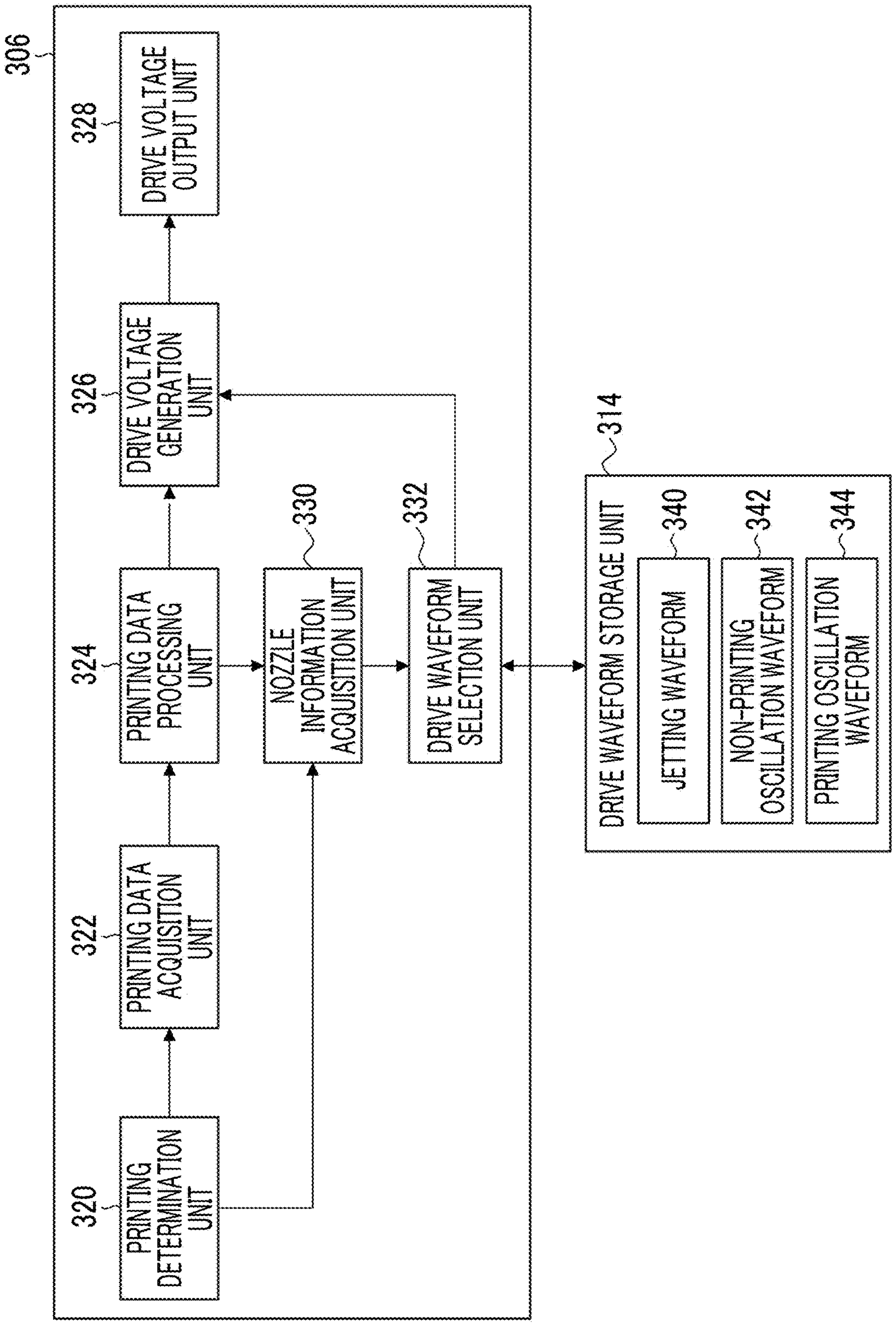
FIG. 8 is a functional block diagram showing a configuration example of a printing control unit shown in FIG. 7.

FIG. 8 is a functional block diagram showing a configuration example of the printing control unit shown in FIG. 7. The printing control unit 306 comprises a printing determination unit 320, a printing data acquisition unit 322, a printing data processing unit 324, a drive voltage generation unit 326, and a drive voltage output unit 328.

The printing determination unit 320 determines whether the period is the printing period in which the printing device 106 executes the printing, or the non-printing period in which the printing device 106 does not execute the printing. The printing period is a period in which the printing device 106 acquires the printing data and jets the ink from the ink jet head 120 based on the printing data.

The non-printing period includes a maintenance period of the ink jet head 120. During the maintenance period of the ink jet head 120 in the non-printing period, a static constant voltage may be supplied to all the nozzles 180. The static constant voltage is a constant voltage at which the static state of the piezoelectric element 212 shown in FIG. 6 is maintained.

In a case of generating a plurality of printed matters, a period between the printing for generating any printed matter and the printing for generating the next printed matter can be determined as the non-printing period. The period between the printing for generating any printed matter and the printing for generating the next printed matter may be determined as the printing period in a case in which a condition in which the drying of the ink does not proceed is satisfied. The condition in which the drying of the ink does not proceed can be appropriately specified depending on the type of the ink, the environmental temperature, and the like.

The printing data acquisition unit 322 acquires the printing data serving as the base data of the printed matter. An image file in a format such as a PDF format can be applied as the printing data. It should be noted that PDF is an abbreviation for a portable document format.

The printing data processing unit 324 performs image processing on the printing data acquired via the printing data acquisition unit 322 to generate the halftone data for each color. The halftone data represents a pixel value for each nozzle and for each jetting timing. The pixel value referred herein includes zero in which the pixel is not formed.

The drive voltage generation unit 326 reads out the drive waveform from the drive waveform storage unit 314 and generates the drive voltage. The drive voltage generation unit 326 defines a potential difference of the drive voltage with respect to an amplitude of the drive waveform. The potential difference of the drive voltage with respect to the amplitude of the drive waveform may be defined for each nozzle 180.

The drive voltage output unit 328 outputs the drive voltage generated by the drive voltage generation unit 326. The drive voltage output unit 328 supplies the drive voltage to each of the nozzles 180 in accordance with an enable signal representing the selection state for each of the nozzles 180. It should be noted that the supply of the drive voltage to the nozzle 180 means the supply of the drive voltage to the piezoelectric element 212 for each nozzle 180.

As the drive waveform, a jetting waveform 340, a non-printing oscillation waveform 342, and a printing oscillation waveform 344 are stored in the drive waveform storage unit 314. The drive voltage generation unit 326 reads out any one of the drive waveforms from the drive waveform storage unit 314 and generates the drive voltage.

The drive voltage generation unit 326 sets the potential difference of the drive voltage with respect to the amplitude of the drive waveform, and generates the drive voltage in which the potential is defined for each timing. The potential difference of the drive voltage is defined for each drive waveform.

The jetting waveform 340 is applied to the jetting nozzle that jets the ink during the printing period. The non-printing oscillation waveform 342 is applied to the non-jetting nozzle that does not jet the ink during the printing period. The printing oscillation waveform 344 is applied to all the nozzles 180 in the printing period. All the nozzles 180 referred herein may exclude the nozzle 180 that is subjected to the mask processing as the non-jetting nozzle.

The printing control unit 306 comprises a nozzle information acquisition unit 330 and a drive waveform selection unit 332. The nozzle information acquisition unit 330 acquires nozzle information indicating whether the nozzle is the jetting nozzle that jets the ink or the non-jetting nozzle that does not jet the ink for each nozzle 180 for each jetting timing in the printing period, based on the halftone data for each color.

The drive waveform selection unit 332 selects any one drive waveform of the jetting waveform 340, the non-printing oscillation waveform 342, or the printing oscillation waveform 344 in accordance with the nozzle information for each nozzle 180 for each jetting timing, and transmits the selected drive waveform to the drive voltage generation unit 326.

The drive voltage generation unit 326 generates the drive voltage in accordance with the nozzle information for each nozzle 180, and supplies the drive voltage in accordance with the nozzle information for each nozzle 180 to each nozzle 180 via the drive voltage output unit 328.

Hardware Configuration Example of Control Device Applied to Printing System

Figure 9:
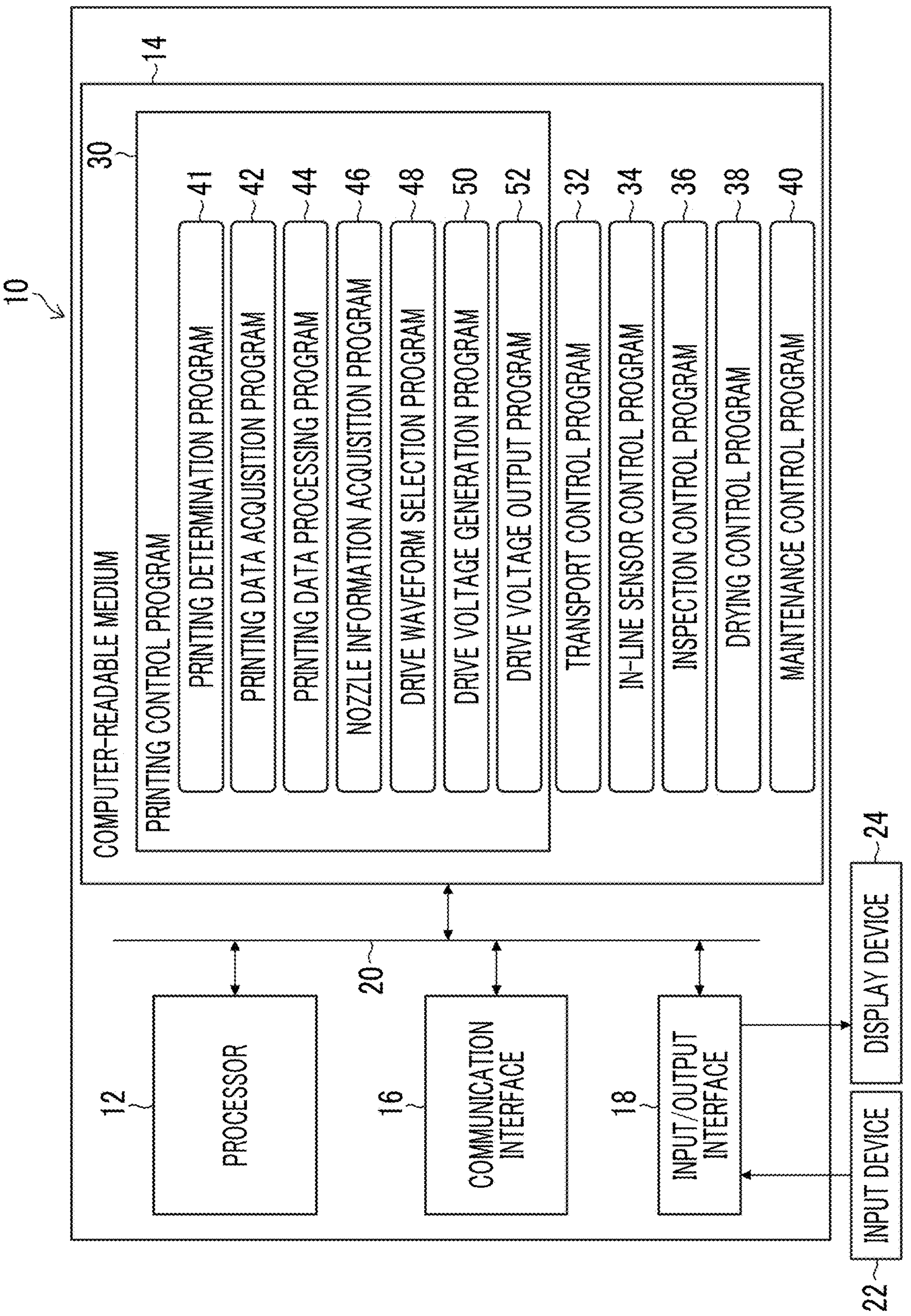
FIG. 9 is a block diagram schematically showing an example of a hardware configuration of the electric configuration shown in FIG. 7.

FIG. 9 is a block diagram schematically showing an example of a hardware configuration of the electric configuration shown in FIG. 7. A control device 10 provided in the printing system 100 comprises a processor 12, a computer-readable medium 14 that is a non-transitory tangible object, a communication interface 16, and an input/output interface 18.

A computer is applied as the control device 10. A form of the computer may be a server, a personal computer, a workstation, a tablet terminal, and the like.

The processor 12 includes a central processing unit (CPU). The processor 12 may include a graphics processing unit (GPU). The processor 12 is connected to the computer-readable medium 14, the communication interface 16, and the input/output interface 18 via a bus 20. An input device 22 and a display device 24 are connected to the bus 20 via the input/output interface 18.

The computer-readable medium 14 includes a memory as a main storage device, and a storage as an auxiliary storage device. A semiconductor memory, a hard disk apparatus, a solid state drive apparatus, and the like may be applied to the computer-readable medium 14. Any combination of a plurality of apparatuses may be applied to the computer-readable medium 14.

It should be noted that the hard disk apparatus can be referred to as HDD that is an abbreviation for hard disk drive in English. The solid state drive apparatus can be referred to as SSD that is an abbreviation for solid state drive in English.

The control device 10 is connected to a network via the communication interface 16, and is communicably connected to an external device. A local area network (LAN) and the like may be applied to the network. It should be noted that the network is not shown.

The computer-readable medium 14 stores a printing control program 30, a transport control program 32, an in-line sensor control program 34, an inspection control program 36, a drying control program 38, and a maintenance control program 40.

The printing control program 30 is applied to the printing control unit 306 shown in FIG. 7 and implements a printing function. The printing control program 30 includes a printing determination program 41, a printing data acquisition program 42, a printing data processing program 44, a nozzle information acquisition program 46, a drive waveform selection program 48, a drive voltage generation program 50, and a drive voltage output program 52.

The printing determination program 41 is applied to the printing determination unit 320 shown in FIG. 8 and implements a printing determination function. The printing data acquisition program 42 is applied to the printing data acquisition unit 322 and implements a printing data acquisition function. The printing data processing program 44 is applied to the printing data processing unit 324 and implements a printing data processing function.

The nozzle information acquisition program 46 is applied to the nozzle information acquisition unit 330 and realizes the acquisition of the nozzle information. The drive waveform selection program 48 is applied to the drive waveform selection unit 332 and implements a drive waveform selection function.

The drive voltage generation program 50 is applied to the drive voltage generation unit 326 and implements a drive voltage generation function. The drive voltage output program 52 is applied to the drive voltage output unit 328 and implements a drive voltage output function.

The transport control program 32 is applied to the transport device 304 shown in FIG. 7 and implements a function of transporting the substrate S. The in-line sensor control program 34 is applied to the in-line sensor control unit 307 and implements an in-line sensor control function.

The inspection control program 36 is applied to the inspection control unit 308 and implements a function of inspecting the image printed on the substrate S. The drying control program 38 is applied to the drying control unit 310 and implements a function of drying the substrate S on which the image is printed by using the printing device 106. The maintenance control program 40 is applied to the maintenance device 140 and implements a function of performing the maintenance of the ink jet head 120.

Various programs stored in the computer-readable medium 14 include one or more commands. Various data, various parameters, and the like are stored in the computer-readable medium 14. It should be noted that the drive waveform storage unit 314 and the memory 316 shown in FIG. 8 can be included in the computer-readable medium 14 shown in FIG. 9.

In the printing system 100, the processor 12 executes various programs stored in the computer-readable medium 14 and implements various functions in the printing system 100. It should be noted that the term “program” is synonymous with the term “software”.

The control device 10 communicates data to and from an external device via the communication interface 16. Various standards, such as universal serial bus (USB), may be applied to the communication interface 16. Either wired communication or wireless communication may be applied to a communication form of the communication interface 16.

The control device 10 is connected to the input device 22 and the display device 24 via the input/output interface 18. An input device, such as a keyboard and a mouse, is applied to the input device 22. The display device 24 displays various information applied to the control device 10.

A liquid crystal display, an organic EL display, a projector, or the like may be applied to the display device 24. Any combination of a plurality of devices may be applied to the display device 24. It should be noted that EL of the organic EL display is an abbreviation for electro-luminescence.

Here, examples of the hardware structure of the processor 12 include a CPU, a GPU, a programmable logic device (PLD), and an application specific integrated circuit (ASIC). The CPU is a general-purpose processor that executes the program and acts as various functional units. The GPU is a processor specialized in the image processing.

The PLD is a processor in which a configuration of an electric circuit can be changed after manufacturing the device. Examples of the PLD include a field programmable gate array (FPGA). The ASIC is a processor comprising a dedicated electric circuit specifically designed to execute specific processing.

One processing unit may be configured by one of these various processors or may be configured by two or more processors of the same type or different types. Examples of a combination of the various processors include a combination of one or more FPGAs and one or more CPUs, and a combination of one or more FPGAs and one or more GPUs. As another example of the combination of the various processors, there is a combination of one or more CPUs and one or more GPUs.

A plurality of functional units may be configured by using one processor. As an example in which the plurality of functional units are configured by using one processor, there is an aspect in which one processor is configured by applying a combination of one or more CPUs and software, such as system on a chip (SoC) represented by the computer, such as a client or a server, and this processor is made to act as the plurality of functional units.

As another example in which the plurality of functional units are configured by using one processor, there is an aspect in which a processor that implements the functions of the entire system including the plurality of functional units by using one IC chip is used. It should be noted that IC is an abbreviation for an integrated circuit.

As described above, various functional units are configured by using one or more of the various processors described above as the hardware structure. Further, the hardware structure of these various processors is, more specifically, an electric circuit (circuitry) in which circuit elements, such as semiconductor elements, are combined.

The computer-readable medium 14 may include semiconductor elements, such as a read only memory (ROM), a random access memory (RAM), and a solid state drive (SSD). The computer-readable medium 14 can include a magnetic storage medium, such as a hard disk. The computer-readable medium 14 can include a plurality of types of storage media.

It should be noted that the processor 12 according to the embodiment is an example of one or more processors. In addition, the computer-readable medium 14 according to the embodiment is an example of one or more memories.

[Procedure of Jetting Head Control Method According to Embodiment]

Figure 10:
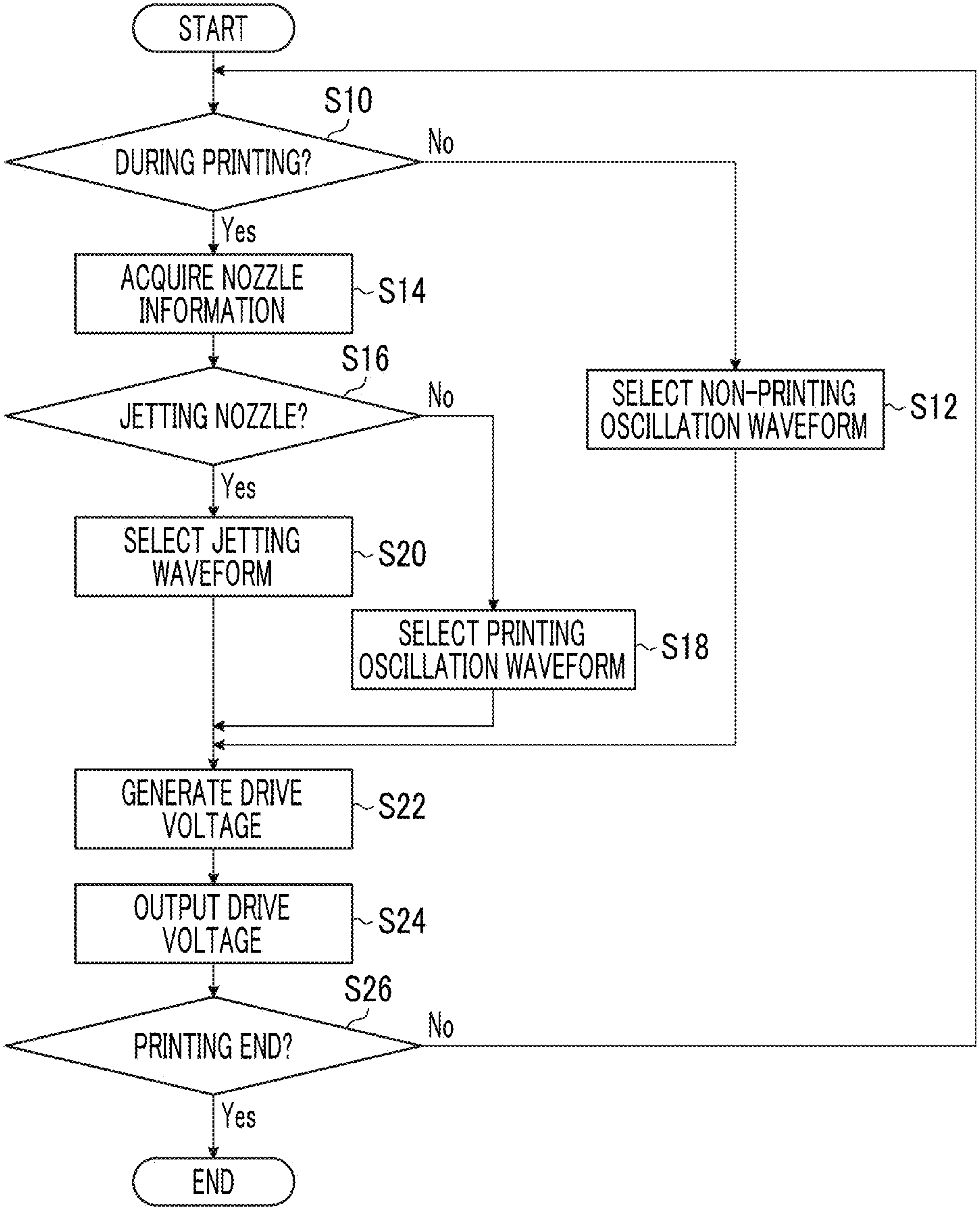
FIG. 10 is a flowchart showing a procedure of a jetting head control method according to the embodiment.

FIG. 10 is a flowchart showing a procedure of a jetting head control method according to the embodiment. In a printing determination step S10, the printing determination unit 320 shown in FIG. 8 determines whether the period is the printing period or the non-printing period.

In the printing determination step S10, in a case in which the printing determination unit 320 determines that the period is the non-printing period, the No determination is made. In a case in which the No determination is made, the processing proceeds to a non-printing period waveform selection step S12. In the non-printing period waveform selection step S12, the drive waveform selection unit 332 selects the non-printing oscillation waveform 342 for all the nozzles 180. After the non-printing period waveform selection step S12, the processing proceeds to a drive voltage generation step S22.

On the other hand, in the printing determination step S10, in a case in which the printing determination unit 320 determines that the period is the printing period, Yes determination is made. In a case in which the Yes determination is made, the processing proceeds to a nozzle information acquisition step S14. In the nozzle information acquisition step S14, the nozzle information acquisition unit 330 acquires the nozzle information indicating whether the nozzle is the jetting nozzle in the printing period or the non-jetting nozzle in the printing period for each nozzle 180. After the nozzle information acquisition step S14, the processing proceeds to a jetting nozzle determination step S16.

In the jetting nozzle determination step S16, the drive waveform selection unit 332 determines whether the nozzle is the jetting nozzle in the printing period or the non-jetting nozzle in the printing period for each nozzle 180, based on the nozzle information.

In the jetting nozzle determination step S16, for the nozzle determined as the non-jetting nozzle in the printing period by the drive waveform selection unit 332, the printing oscillation waveform 344 is selected in a printing oscillation waveform selection step S18. After the printing oscillation waveform selection step S18, the processing proceeds to the drive voltage generation step S22.

On the other hand, in the jetting nozzle determination step S16, for the nozzle determined as the jetting nozzle in the printing period by the drive waveform selection unit 332, the jetting waveform 340 is selected in a jetting waveform selection step S20. After the jetting waveform selection step S20, the processing proceeds to the drive voltage generation step S22.

In the drive voltage generation step S22, the drive voltage generation unit 326 applies the selected drive waveform for each of the nozzles 180 to generate the drive voltage for each of the nozzles 180. After the drive voltage generation step S22, the processing proceeds to a drive voltage output step S24.

In the drive voltage output step S24, the drive voltage output unit 328 supplies the drive voltage for each jetting timing to each nozzle 180 based on the enable signal. After the drive voltage output step S24, the processing proceeds to a printing end determination step S26.

In the printing end determination step S26, the printing control unit 306 shown in FIG. 7 determines whether a printing end condition is satisfied. In the printing end determination step S26, in a case in which the printing control unit 306 determines that the printing end condition is not satisfied, No determination is made.

In a case in which the No determination is made, the processing proceeds to the printing determination step S10, and each processing from the printing determination step S10 to the printing end determination step S26 is repeatedly executed until the No determination is made in the printing end determination step S26.

On the other hand, in the printing end determination step S26, in a case in which the printing control unit 306 determines that the printing end condition is satisfied, Yes determination is made. In a case in which the Yes determination is made, predetermined end processing is executed, and the procedure of the jetting head control method ends.

[Detailed Description of Meniscus Oscillation]

In the ink jet printing, it is difficult to perform the ink jetting and the moisturizing of the nozzle surface 162 in a period other than the printing period, the period in which the ink jet head 120 is capped, such as the movement period of the ink jet head 120 between pages, and the printing standby period at the printing position of the ink jet head 120.

In a case in which both the ink jetting and the moisturizing are difficult, the meniscus can be efficiently caused to oscillate without jetting the ink, and thus the performance degradation of the nozzle 180 due to the drying of the ink inside the nozzle 180 can be suppressed for a long period. The long period referred herein is a period in which the deterioration that affects the life of the ink jet head 120 may occur.

In a case in which the ink having high drying properties is used, the deterioration of the ink jet head 120 gradually proceeds even in a case in which a slight amount of the dried and solidified substance is deposited inside the nozzle 180.

Therefore, the meniscus oscillation applied to efficiently suppress a meniscus film formation phenomenon for a short period is executed to suppress the expression of the meniscus film formation phenomenon on the ink inside the nozzle 180. In addition, efficient meniscus oscillation promotes re-dispersion of the dried and solidified substance into the ink even in a case in which the dried and solidified substance is formed inside the nozzle 180. Further, efficient meniscus oscillation can peel the dried and solidified substance adhering inside the nozzle 180 from the nozzle 180.

Specifically, the total amount of oscillation is larger than in the meniscus oscillation applied to the suppression of the meniscus film formation phenomenon in a short period. Examples of the increase in the total amount of oscillation include the increase in the number of oscillations per unit time, which is an indicator of the total amount of oscillation, and the increase in the amplitude of the oscillation. In a case in which the total amount of oscillation is increased, both the increase in the number of oscillations and the increase in the amplitude of the oscillation may be executed.

On the other hand, in a case in which the total amount of oscillation in the meniscus oscillation is increased, the meniscus may be unintentionally destroyed, and the ink may flow out to the outside of the nozzle 180. Therefore, the pulse waveform is applied as the oscillation voltage used during meniscus oscillation, and the pulse width close to the natural period of the ink jet head 120 is applied. As a result, even in a case in which the resonance between the ink jet head 120 and the ink is excited, the excited resonance is canceled.

Here, the pulse waveform is not limited to a rectangular wave. For example, a waveform in which at least any one of a rise time or a fall time exceeds zero is included. Further, the plurality of pulse waveforms may include different types of waveforms.

In a case in which the number of meniscus oscillations is increased, the pulse width close to the natural period of the ink jet head 120 is applied, and the pulse interval shifted from the natural period of the ink jet head 120 is applied. As a result, the excitation of the resonance between the ink jet head 120 and the ink is suppressed, and the attenuation of the ink oscillation is suppressed.

Specifically, in a case in which the natural period of the ink jet head 120 is denoted by $T_C$ and N is an integer of 1 or more, the pulse width $T_W$ of the oscillation voltage is in a range of $(3/4)\times T_C<T_W<(5/4)\times T_C$. In addition, the pulse interval $T_{INT}$ of the oscillation voltage is set such that $T_{INT}=\{N+(1/2)\}\times(T_C/2)$ using the natural period $T_C$ of the ink jet head 120. It should be noted that the pulse interval $T_{INT}$ of the oscillation voltage can be understood as the pulse interval of the oscillation waveform.

In a case in which the pulse interval $T_{INT}$ of the oscillation voltage is set to an integer multiple of the natural period $T_C$ of the ink jet head 120, there is a risk that the resonance between the ink jet head 120 and the ink is unintentionally excited, and the period that can be applied to the oscillation voltage is limited to one.

The oscillation voltage in the present embodiment is the drive voltage to which the oscillation waveform is applied, and includes the printing oscillation voltage applied to the non-jetting nozzle in the printing period and the non-printing oscillation voltage applied in the non-printing period.

Figure 11:
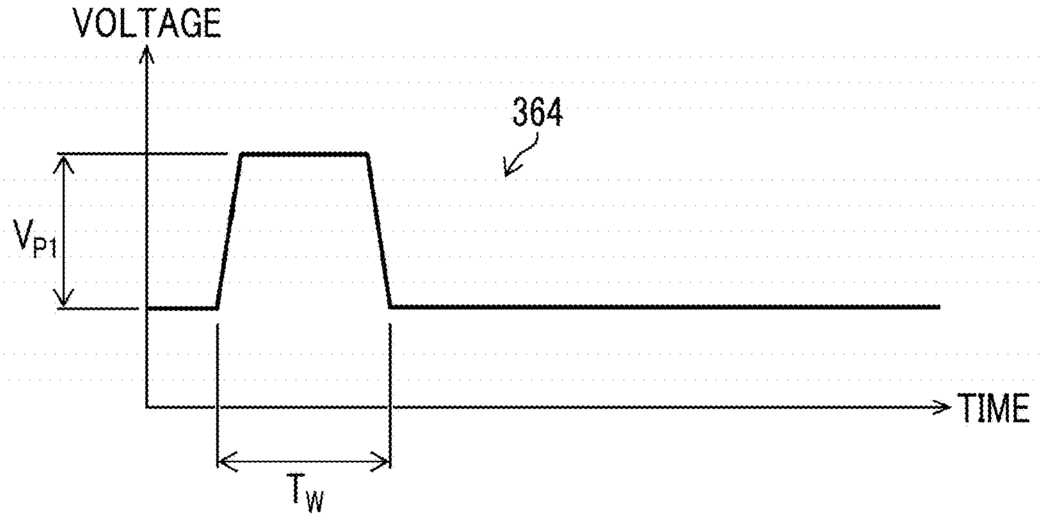
FIG. 11 is a schematic view showing an example of a printing oscillation voltage.

FIG. 11 is a schematic view showing an example of the printing oscillation voltage. FIG. 11 shows a printing oscillation voltage 364 to which the printing oscillation waveform 344 in which the number of pulses per unit time is set to one is applied. The jetting period of the ink jet head 120 can be applied as the unit time. The pulse width $T_W$ of the printing oscillation voltage 364 is in a range of $(3/4)\times T_C<T_W<(5/4)\times T_C$. The maximum voltage of the printing oscillation voltage 364 is $VP_1$.

The pulse width $T_W$ is a period between timings at which the reference potential $V_S$ is obtained. It should be noted that the potential difference of the oscillation voltage corresponds to the amplitude of the drive waveform. The potential of the oscillation voltage corresponds to the positional width of the drive waveform. The period of the oscillation voltage corresponds to the period of the oscillation waveform.

The meniscus oscillation is also executed for the non-jetting nozzle in the printing period, and the meniscus oscillation in the printing period of the nozzle 180 having a relatively low usage ratio is executed, and the drying and solidification of the ink in the nozzle 180 having a relatively low usage ratio is prevented.

Figure 12:
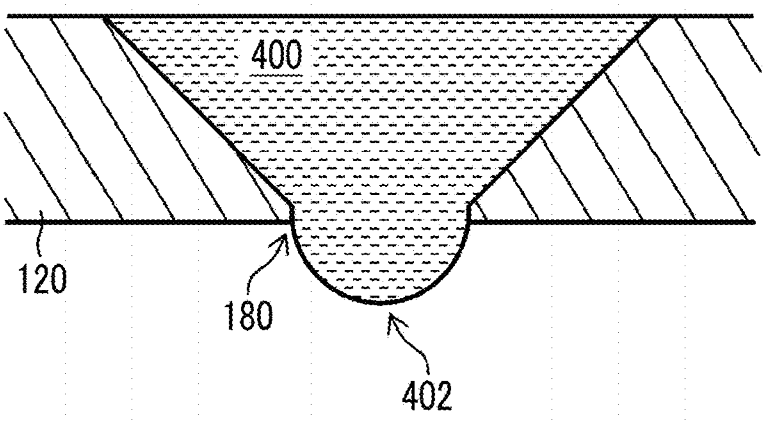
FIG. 12 is a schematic view of meniscus oscillation applied to a non-jetting nozzle in a printing period.

FIG. 12 is a schematic view of meniscus oscillation applied to a non-jetting nozzle in a printing period. FIG. 12 shows a state in which the printing oscillation voltage 364 shown in FIG. 11 is supplied to the piezoelectric element 212 and a meniscus 402 is caused to oscillate without jetting an ink 400 from the nozzle 180.

Figure 13:
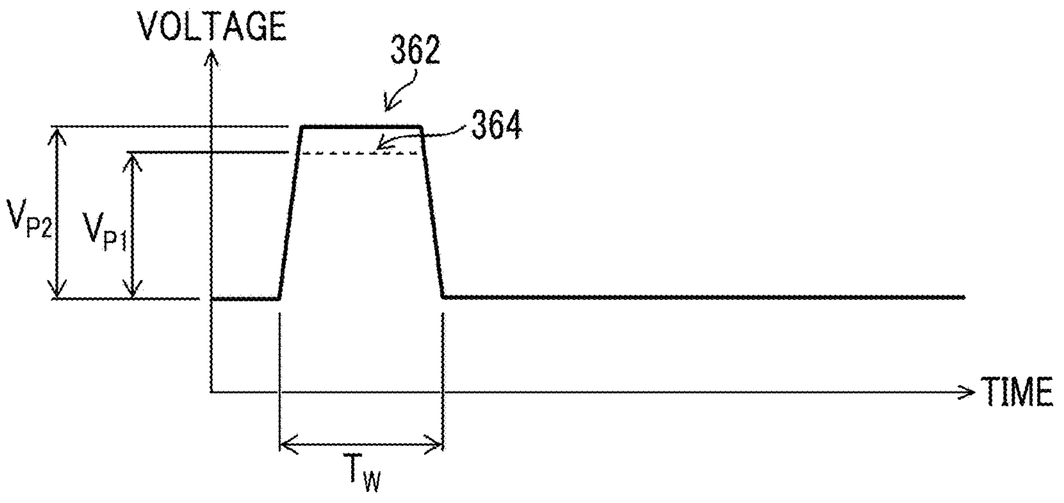
FIG. 13 is a schematic view showing an example of a non-printing oscillation voltage.

FIG. 13 is a schematic view showing an example of the non-printing oscillation voltage. FIG. 13 shows a non-printing oscillation voltage 362 to which the non-printing oscillation waveform 342 in which the number of pulses per unit time is one is applied. The non-printing oscillation voltage 362 is shown by a solid line, and the printing oscillation voltage 364 is shown by a broken line. It should be noted that the non-printing oscillation voltage 362 and the printing oscillation voltage 364 are shown in a superimposed manner.

The maximum potential difference $V_{P2}$ of the non-printing oscillation voltage 362 exceeds the maximum potential difference $V_{P1}$ of the printing oscillation voltage 364. In the example shown in FIG. 13, the maximum potential difference $V_{P2}$ of the non-printing oscillation voltage 362 is 1.2 times the maximum potential difference $V_{P1}$ of the printing oscillation voltage 364. Similarly to the printing oscillation voltage 364, the pulse width $T_W$ of the non-printing oscillation voltage 362 is in a range of $(3/4)\times T_C < T_W < (5/4)\times T_C$.

Figure 14:
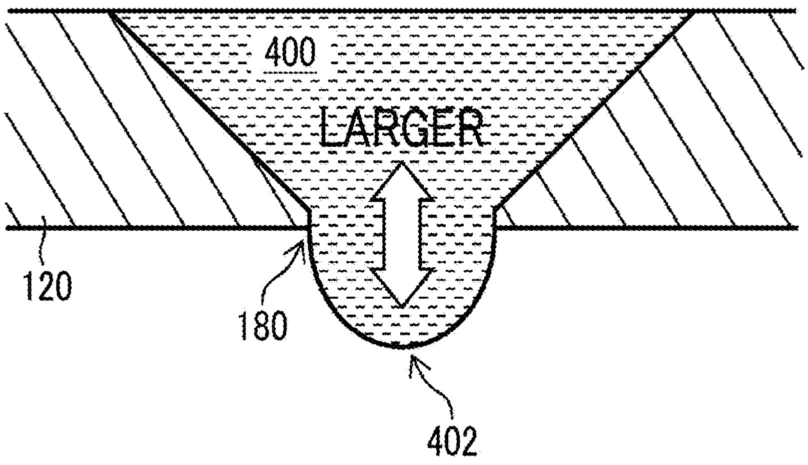
FIG. 14 is a schematic view of meniscus oscillation applied to a nozzle in a non-printing period.

FIG. 14 is a schematic view of the meniscus oscillation applied to the nozzle in the non-printing period. The meniscus 402 shown in FIG. 14 has a larger amplitude than the meniscus 402 shown in FIG. 12. That is, the meniscus oscillation to which the non-printing oscillation voltage 362 is applied has a larger total amount of oscillation than the meniscus oscillation to which the printing oscillation voltage 364 is applied.

Figure 15:
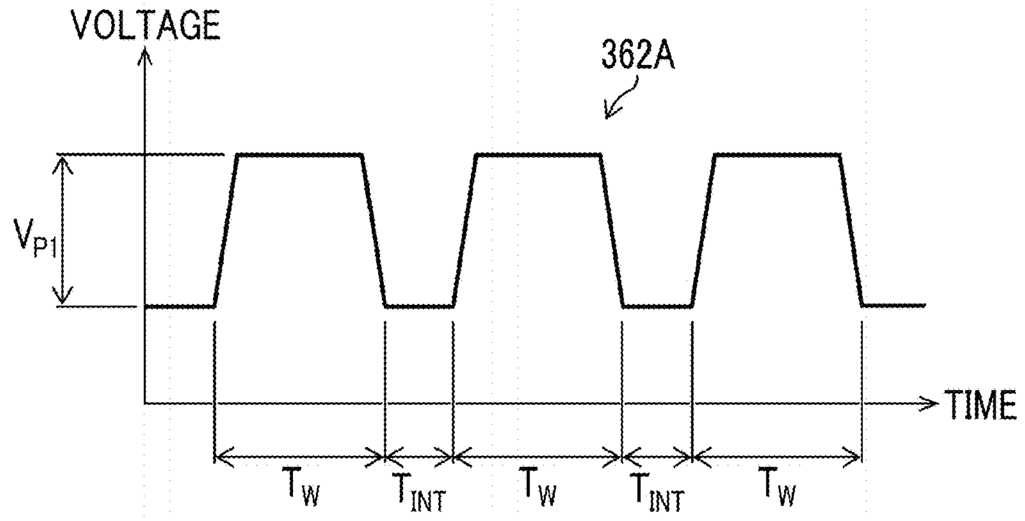
FIG. 15 is a schematic view showing another example of the non-printing oscillation voltage.

FIG. 15 is a schematic view showing another example of the non-printing oscillation voltage. FIG. 15 shows a non-printing oscillation voltage 362A in which the number of pulses per unit time is set to three. The non-printing oscillation voltage 362A has the same maximum potential difference $V_{P1}$ as the printing oscillation voltage 364 shown in FIG. 11. The number of pulses per unit time of the non-printing oscillation voltage 362A exceeds the number of pulses per unit period of the printing oscillation voltage 364. FIG. 15 shows the non-printing oscillation voltage 362A to which three is applied as the number of pulses per unit time.

Similarly to the printing oscillation voltage 364 shown in FIG. 11, the non-printing oscillation voltage 362A has the pulse width $T_W$ in a range of $(3/4)\times T_C < T_W < (5/4)\times T_C$. In addition, the non-printing oscillation voltage 362A has the pulse interval $T_{INT}$ that is $T_{INT}=\{N+(1/2)\}\times(T_C/2)$.

The meniscus oscillation is also executed for the non-jetting nozzle in the printing period, and the meniscus oscillation in the printing period is also executed for the nozzle 180 having a relatively low usage ratio, and the drying and solidification of the ink in the nozzle 180 having a relatively low usage ratio is prevented.

Figure 16:
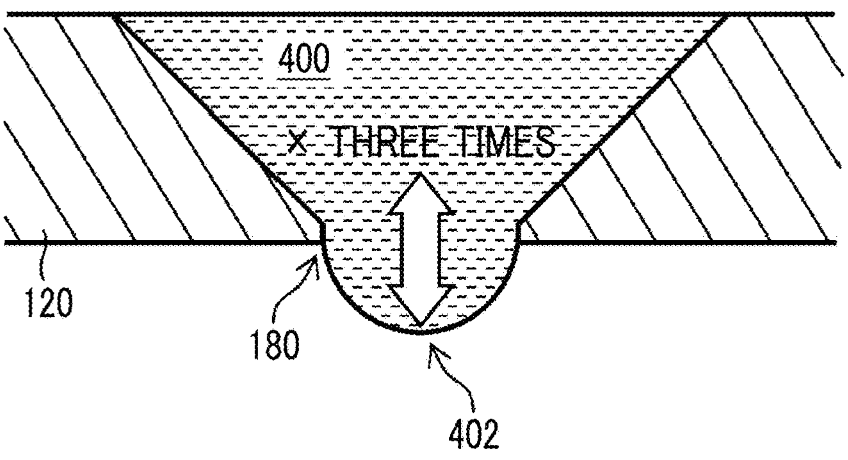
FIG. 16 is a schematic view of meniscus oscillation to which the non-printing oscillation voltage shown in FIG. 15 is applied.

FIG. 16 is a schematic view of the meniscus oscillation to which the non-printing oscillation voltage shown in FIG. 15 is applied. The meniscus 402 shown in FIG. 16 has a larger number of oscillations than the meniscus 402 shown in FIG. 12. That is, the meniscus oscillation to which the non-printing oscillation voltage 362A is applied has a larger total amount of oscillation than the meniscus oscillation to which the printing oscillation voltage 364 is applied.

[Example of Non-Jetting Waveform Using Jetting Waveform]

Figure 17:
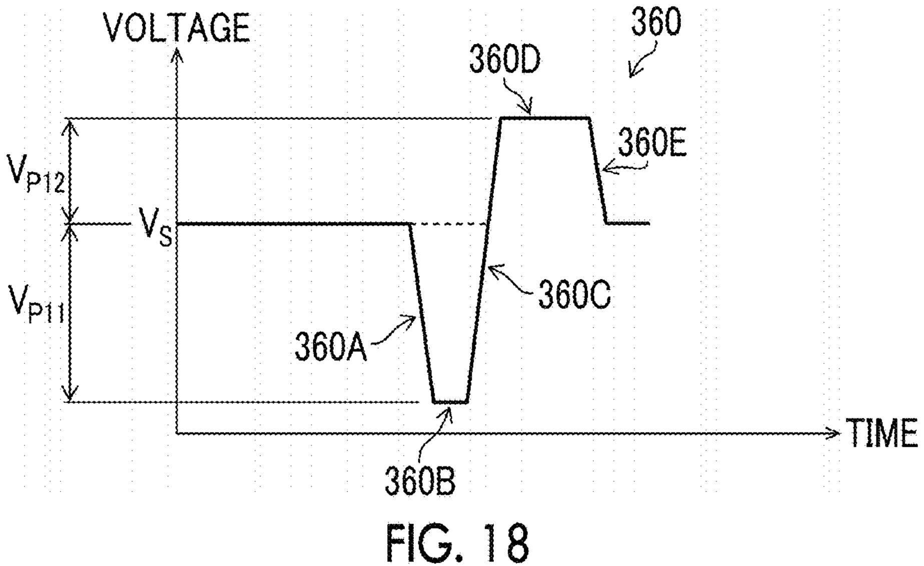
FIG. 17 is a schematic view showing an example of a jetting voltage applied to the jetting nozzle.

FIG. 17 is a schematic view showing an example of the jetting voltage applied to the jetting nozzle. A jetting voltage 360 shown in FIG. 17 includes a first element 360A, a second element 360B, a third element 360C, a fourth element 360D, and a fifth element 360E.

The first element 360A corresponds to a pulling operation of pulling the meniscus 402 into the inside of the nozzle 180. The second element 360B corresponds to a pulling-in holding operation of holding the meniscus 402 in a pulled-in state.

The third element 360C corresponds to a pushing operation of pushing the meniscus 402 from a state in which the meniscus 402 is pulled into the outside of the nozzle 180. The fourth element 360D corresponds to a pushing holding operation of holding the meniscus 402 in a state of being pushed out to the outside of the nozzle 180.

The fifth element 360E corresponds to a pulling-in operation of pulling the meniscus 402 pushed out to the outside of the nozzle 180 into the inside of the nozzle 180. The fourth element 360D and the fifth element 360E mainly suppress the reverberation of the meniscus 402 after the ink is jetted.

That is, a portion of the third element 360C on the fourth element 360D side with respect to the reference potential $V_S$, the fourth element 360D, and the fifth element 360E can be defined as a meniscus reverberation voltage for suppressing the reverberation of the meniscus 402. The waveform of the meniscus reverberation voltage can be understood as a waveform element of the drive waveform, for example, each of the waveform elements constituting the jetting voltage 360 can be understood as a waveform element constituting the drive waveform applied to the jetting voltage 360. The waveform of the meniscus reverberation voltage can be understood as a reverberation suppression waveform.

Figure 18:
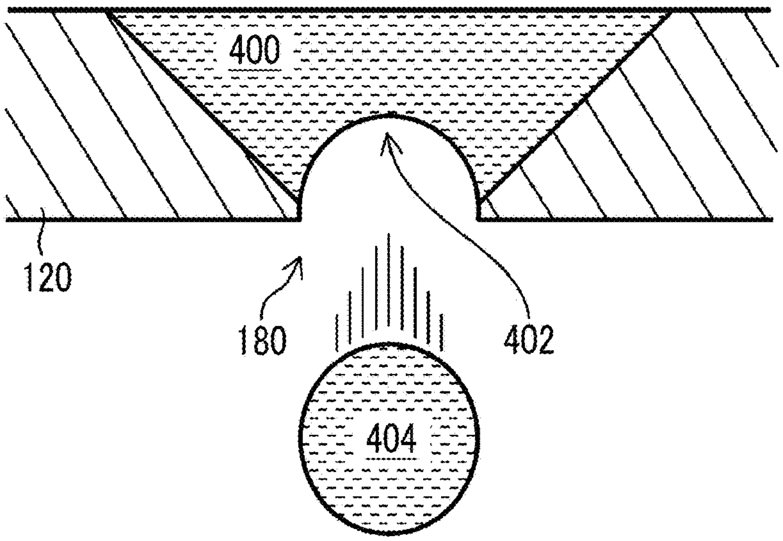
FIG. 18 is a schematic view of ink jetting to which the jetting waveform shown in FIG. 17 is applied.

FIG. 18 is a schematic view of the ink jetting to which the jetting waveform shown in FIG. 17 is applied. FIG. 18 shows a state in which an ink liquid droplet 404 is jetted from the nozzle 180, and the meniscus 402 inside the nozzle 180 is formed.

$V_S$ shown in FIG. 17 is a reference potential that is a reference in a case of stabilizing the meniscus 402 shown in FIG. 18. $V_{P11}$ is a potential difference from the reference potential $V_S$ in a case of executing the pulling operation of the meniscus 402, and $V_{P11}+V_{P12}$ is a potential difference in a case of executing the pushing operation of the meniscus 402.

Figure 19:
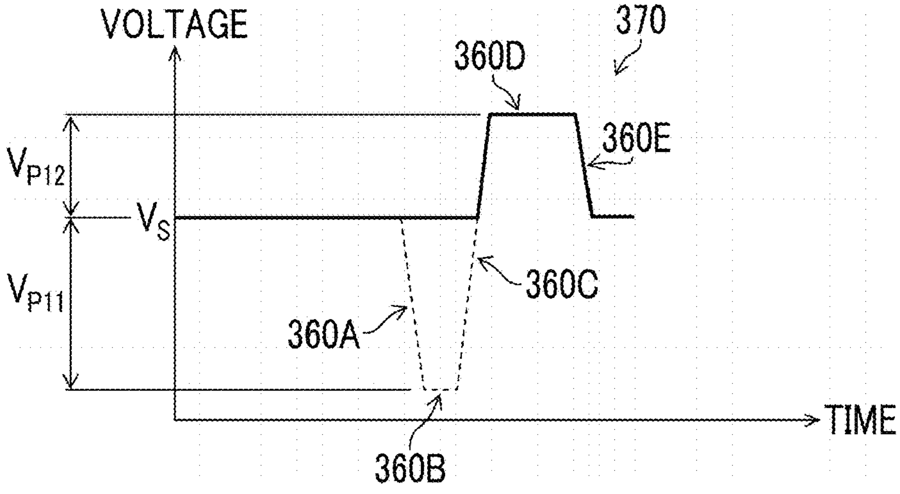
FIG. 19 is a schematic view of an oscillation waveform to which a part of the jetting waveform shown in FIG. 17 is applied.

FIG. 19 is a schematic view of the oscillation waveform to which a part of the jetting waveform shown in FIG. 17 is applied. An oscillation voltage 370 shown in FIG. 19 includes a portion of the potential difference $V_{P12}$ in the third element 360C shown in FIG. 17, and the fourth element 360D and the fifth element 360E.

The oscillation voltage 370 shown in FIG. 19 has the potential difference $V_{P12}$ and has the maximum potential difference that is smaller than the potential difference $V_{P11}$+ the potential difference $V_{P12}$, which is the maximum potential difference in the jetting waveform 340 shown in FIG. 17.

For example, as the printing oscillation voltage 364 shown in FIG. 11, the oscillation voltage 370 which is a part of the jetting voltage 360 shown in FIG. 17 may be applied. On the other hand, it is preferable that the non-printing oscillation voltage 362 is independent of the jetting voltage 360 and is not constrained by the jetting voltage 360, and that the amplitude and the frequency of the waveform are defined.

On the other hand, the non-printing oscillation voltage 362 has the same pulse width as the oscillation voltage 370 formed as a part of the jetting voltage 360, and defines a unique pulse period of the non-printing oscillation voltage 362. As a result, the effect of the meniscus oscillation in the non-printing period can be relatively enhanced without an additional waveform design as the non-printing oscillation waveform 342 applied to the non-printing oscillation voltage 362.

The meniscus oscillation described above provides a relatively high ink oscillation effect in the circulation type ink jet head 120 of which the configuration example is shown in FIG. 6.

In the non-circulating ink jet head described in JP2013-240947A, JP2020-001199A, and JP5594221B, there is a concern that the drying of the ink is accelerated in a case in which meniscus oscillation is performed for a long period. On the other hand, in the circulation type ink jet head 120 according to the present embodiment, the re-dispersion of the ink can be expected.

[Action and Effect of Printing System According to Embodiment]

The printing system 100 and the jetting head control method according to the embodiment can obtain the following actions and effects.

[1]

The non-printing oscillation voltage 362 has a larger total amount of oscillation representing the degree of the ink oscillation than the printing oscillation voltage 364 applied to the non-jetting nozzle in the printing period. In addition, in the non-printing period, in the printing oscillation voltage 364 applied to all the nozzles, the pulse waveform is applied and the pulse width $T_W$ is represented by $(3/4)\times T_C<T_W<(5/4)\times T_C$ in a case in which the natural period of the ink jet head 120 is $T_C$. As a result, efficient meniscus oscillation in which the meniscus film formation suppression is accelerated and unintended ink jetting is avoided is realized.

[2]

The total amount of oscillation is an indicator of at least any of the number of oscillations or the amplitude per unit time. As a result, the adjustment of the total amount of oscillation can be realized by applying the adjustment of the non-printing oscillation voltage 362.

[3]

The non-printing oscillation voltage 362 includes the plurality of pulse waveforms, and the pulse interval $T_{INT}$ is set such that $T_{INT}=\{N+(1/2)\}\times(T_C/2)$. As a result, in the meniscus oscillation, the excitation of the resonance with the ink jet head 120 is suppressed, and the attenuation of the meniscus oscillation is also suppressed.

[4]

A part of the jetting voltage 360 applied to the nozzle that jets the ink is applied to the printing oscillation voltage 364. The non-printing oscillation voltage 362 has the same pulse width or the substantially the same pulse width as the pulse width of the printing oscillation voltage 364. As a result, the non-printing oscillation voltage 362 in which efficient meniscus oscillation is realized without a dedicated waveform design for the non-printing oscillation voltage 362 is obtained. The substantially same pulse width is a pulse width in which the ink oscillation that can obtain the same action and effect as the ink oscillation to which the printing oscillation voltage 364 is applied is realized.

[Example of Application to Jetting Head Control Device]

A jetting head control device comprising the printing control unit 306 and the drive waveform storage unit 314 in the printing system 100 according to the embodiment can be configured. A computer is applied as the hardware of the jetting head control device, and various programs included in the printing control program 30 shown in FIG. 9 can be executed to implement various functions shown in FIG. 8.

[Example of Application to Program]

The various programs included in the printing control program 30 shown in FIG. 9 can be programs for implementing various functions of the jetting control device that executes the jetting control of the ink jet head 120.

In the embodiments of the present invention described above, the configuration elements can be changed, added, or deleted as appropriate without departing from the spirit of the present invention. The present invention is not limited to the embodiments described above, and various modifications can be made by those having ordinary knowledge in the field within the technical idea of the present invention.

EXPLANATION OF REFERENCES

10: control device
12: processor
14: computer-readable medium
16: communication interface
18: input/output interface
20: bus
22: input device
24: display device
30: printing control program
32: transport control program
34: in-line sensor control program
36: inspection control program
38: drying control program
40: maintenance control program
42: printing data acquisition program
44: printing data processing program
46: nozzle information acquisition program
48: drive waveform selection program
50: drive voltage generation program
52: drive voltage output program
100: printing system
102: substrate supply device
104: first intermediate transport device
106: printing device
108: second intermediate transport device
110: inspection device
112: drying device
114: accumulation device
120: ink jet head
120C: ink jet head
120K: ink jet head
120M: ink jet head
120Y: ink jet head
122: printing drum
123: in-line sensor
124: nozzle surface
140: maintenance device
142: head moving device
144: wiping device
146: cap device
150: carriage
152: guide
154: discharge flow channel
156: discharge pump
158: discharge tank
160: head module
162: nozzle surface
164: head frame
166: dummy plate
168: flexible substrate
170: nozzle plate
172: ink supply chamber
174: ink circulation chamber
176: supply-side individual flow channel
178: recovery-side individual flow channel
180: nozzle
182: nozzle opening
184: nozzle disposition portion
200: ink supply path
202: individual supply path
204: pressure chamber
206: nozzle communication path
208: individual circulation flow channel
210: common circulation flow channel
212: piezoelectric element
214: vibration plate
216: flow channel structure
222: adhesive layer
224: lower electrode
226: piezoelectric layer
228: upper electrode
230: circulation outlet
300: system control unit

302: transport control unit
304: transport device
306: printing control unit
307: in-line sensor control unit
308: inspection control unit
310: drying control unit
312: maintenance control unit
314: drive waveform storage unit
316: memory
318: sensor
320: printing determination unit
322: printing data acquisition unit
324: printing data processing unit
326: drive voltage generation unit
328: drive voltage output unit
330: nozzle information acquisition unit
332: drive waveform selection unit
340: jetting waveform
344: printing oscillation waveform
360A: first element
360B: second element
360C: third element
360D: fourth element
360E: fifth element
362: non-printing oscillation voltage
362A: non-printing oscillation voltage
370: oscillation voltage
400: ink
402: meniscus
404: ink liquid droplet
Each step from S10 to S26: each step of jetting head control method

What is claimed is:

1. A jetting head control device that supplies a drive voltage to a jetting head provided with a plurality of nozzles to control the jetting head, the jetting head control device comprising:

one or more processors; and one or more memories in which a program to be executed by the one or more processors is stored, wherein the one or more processors execute the program to:

supply a non-printing oscillation voltage to which a non-printing oscillation waveform for causing liquid to oscillate without jetting the liquid is applied, to the nozzle in a non-printing period in which a printing operation is not executed; and supply a printing oscillation voltage to which a printing oscillation waveform for causing the liquid to oscillate without jetting the liquid is applied, to a non-jetting nozzle that does not jet the liquid in a printing period in which the printing operation is executed, the non-printing oscillation waveform includes a plurality of pulse waveforms, in a case in which a natural period of the jetting head is denoted by $T_C$, a pulse width $T_W$ is represented by $(3/4)\times T_C<T_W<(5/4)\times T_C$, in a case in which Nis an integer of 1 or more and a pulse interval of the plurality of pulse waveforms is denoted by $T_{INT}$, the pulse interval $T_{INT}$ is represented by $T_{INT}=(N+1/2)\times(T_C/2)$ using the natural period $T_C$, and the pulse interval is shifted from the natural period $T_C$ of the jetting head, and an indicator of a total amount of oscillation in which a total amount of oscillation, which is an indicator of oscillation of an ink, is larger than a total amount of oscillation in the printing oscillation waveform is applied.

2. The jetting head control device according to claim 1, wherein the number of pulses per unit time in the non-printing oscillation waveform is applied as the indicator of the total amount of oscillation, and in the non-printing oscillation waveform, the number of pulses per unit time exceeding the number of pulses per unit time in the printing oscillation waveform is applied.

3. The jetting head control device according to claim 1, wherein a potential difference with a reference potential in the drive voltage is applied as the indicator of the total amount of oscillation, and in the non-printing oscillation voltage, a potential difference with the reference potential, which exceeds a potential difference with the reference potential in the printing oscillation voltage, is applied.

4. The jetting head control device according to claim 1, wherein, in the printing oscillation waveform, a pulse width that is the same as a pulse width of the non-printing oscillation waveform is applied.

5. The jetting head control device according to claim 1, wherein the one or more processors supply a jetting voltage at which a jetting waveform for jetting the liquid from the nozzle is applied, to the nozzle that jets the liquid in the printing period, and in the printing oscillation waveform, a part of the jetting waveform is applied.

6. The jetting head control device according to claim 5, wherein the jetting waveform includes a reverberation suppression waveform for suppressing liquid oscillation in a case in which the liquid is jetted, and in the printing oscillation waveform, the reverberation suppression waveform in the jetting waveform is applied.

7. The jetting head control device according to claim 6, wherein the non-printing oscillation waveform has a pulse width that is the same as a pulse width of the reverberation suppression waveform.

8. A jetting head control method for supplying a drive voltage to a jetting head provided with a plurality of nozzles to control the jetting head, the jetting head control method comprising:

supplying a non-printing oscillation voltage to which a non-printing oscillation waveform for causing liquid to oscillate without jetting the liquid is applied, to the nozzle in a non-printing period in which a printing operation is not executed; and supplying a printing oscillation voltage to which a printing oscillation waveform for causing the liquid to oscillate without jetting the liquid is applied, to a non-jetting nozzle that does not jet the liquid in a printing period in which the printing operation is executed, wherein, the non-printing oscillation waveform includes a plurality of pulse waveforms, in a case in which a natural period of the jetting head is denoted by $T_C$, a pulse width $T_W$ is represented by $(3/4)\times T_C<T_W<(5/4)\times T_C$, in a case in which N is an integer of 1 or more and a pulse interval of the plurality of pulse waveforms is denoted by $T_{INT}$, the pulse interval $T_{INT}$ is represented by $T_{INT}=(N+1/2)\times(T_C/2)$ using the natural period $T_C$, and the pulse interval is shifted from the natural period $T_C$ of the jetting head, and an indicator of a total amount of oscillation in which a total amount of oscillation, which is an indicator of oscillation of an ink, is larger than a total amount of oscillation in the printing oscillation waveform is applied.

9. A non-transitory, computer-readable tangible recording medium on which a program for causing, when read by a computer, the computer to execute the jetting head control method according to claim 8 is recorded.

10. A liquid jet system comprising:

a jetting head provided with a plurality of nozzles; and a jetting head control device that supplies a drive voltage to the jetting head to control the jetting head, wherein the jetting head control device includes:

one or more processors; and one or more memories in which a program to be executed by the one or more processors is stored, the one or more processors execute the program to:

supply a non-printing oscillation voltage to which a non-printing oscillation waveform for causing liquid to oscillate without jetting the liquid is applied, to the nozzle in a non-printing period in which a printing operation is not executed; and supply a printing oscillation voltage to which a printing oscillation waveform for causing the liquid to oscillate without jetting the liquid is applied, to a non-jetting nozzle that does not jet the liquid in a printing period in which the printing operation is executed, the non-printing oscillation waveform includes a plurality of pulse waveforms, in a case in which a natural period of the jetting head is denoted by $T_C$, a pulse width $T_W$ is represented by $(3/4)\times T_C<T_W<(5/4)\times T_C$, in a case in which N is an integer of 1 or more and a pulse interval of the plurality of pulse waveforms is denoted by $T_{INT}$, the pulse interval $T_{INT}$ is represented by $T_{INT}=(N+1/2)\times(T_C/2)$ using the natural period $T_C$, and the pulse interval is shifted from the natural period $T_C$ of the jetting head, and an indicator of a total amount of oscillation in which a total amount of oscillation, which is an indicator of oscillation of an ink, is larger than a total amount of oscillation in the printing oscillation waveform is applied.

11. The liquid jet system according to claim 10, wherein the jetting head includes a circulation flow channel through which the liquid circulates from each of the plurality of nozzles to an internal flow channel.

* * * * *